US010721413B2

(12) United States Patent
Abe

(10) Patent No.: US 10,721,413 B2
(45) Date of Patent: Jul. 21, 2020

(54) MICROSCOPY SYSTEM, MICROSCOPY METHOD, AND COMPUTER READABLE RECORDING MEDIUM

(71) Applicant: OLYMPUS CORPORATION, Tokyo (JP)

(72) Inventor: Yoko Abe, Hino (JP)

(73) Assignee: OLYMPUS CORPORATION, Tokyo (JP)

(*) Notice: Subject to any disclaimer, the term of this patent is extended or adjusted under 35 U.S.C. 154(b) by 79 days.

(21) Appl. No.: 15/996,708

(22) Filed: Jun. 4, 2018

(65) Prior Publication Data
US 2018/0278826 A1 Sep. 27, 2018

Related U.S. Application Data

(63) Continuation of application No. PCT/JP2015/084448, filed on Dec. 8, 2015.

(51) Int. Cl.
*H04N 5/235* (2006.01)
*G06T 5/50* (2006.01)
(Continued)

(52) U.S. Cl.
CPC ......... *H04N 5/2356* (2013.01); *G02B 21/367* (2013.01); *G02B 21/368* (2013.01);
(Continued)

(58) Field of Classification Search
CPC .............. G02B 21/367; G02B 21/368; G02B 27/0075; G06T 2200/21;
(Continued)

(56) References Cited

U.S. PATENT DOCUMENTS 6,711,283 B1 * 3/2004 Soenksen ............. G02B 21/002
382/133
2002/0085744 A1 * 7/2002 Domanik ............ G01N 15/1475
382/133
(Continued)

FOREIGN PATENT DOCUMENTS

JP 2012-173391 A 9/2012
JP 2013-080144 A 5/2013
(Continued)

OTHER PUBLICATIONS

International Search Report dated Mar. 8, 2016 issued in PCT/JP2015/084448.

*Primary Examiner* — Peter D Le
(74) *Attorney, Agent, or Firm* — Scully, Scott, Murphy & Presser, P.C.

(57) ABSTRACT

A microscopy system includes: an imaging unit configured to capture a subject image generated by an observation optical system of a microscope, and acquire an image; a shifting unit configured to shift positions of a focal plane and a field of view of the observation optical system; an imaging control unit configured to cause the imaging unit to acquire a multi-focused image by shifting the positions of the focal plane and the field of view in one exposure period of the imaging unit; a shift amount acquisition processing unit configured to acquire a shift amount, by which the position of the field of view is shifted; an all-focused image generating unit configured to respectively generate plural all-focused images based on plural multi-focused images and on blurring information; and a display unit configured to consecutively display the generated plural all-focused images.

7 Claims, 26 Drawing Sheets

(51) Int. Cl.
  *G02B 27/00* (2006.01)
  *G06T 7/11* (2017.01)
  *G06T 7/571* (2017.01)
  *G02B 21/36* (2006.01)
  *H04N 5/225* (2006.01)
  *H04N 5/232* (2006.01)
(52) U.S. Cl.
  CPC .......... *G02B 27/0075* (2013.01); *G06T 5/50* (2013.01); *G06T 7/11* (2017.01); *G06T 7/571* (2017.01); *H04N 5/2259* (2013.01); *H04N 5/23293* (2013.01); *G06T 2200/21* (2013.01); *G06T 2207/10056* (2013.01); *G06T 2207/10148* (2013.01); *H04N 5/232133* (2018.08)
(58) Field of Classification Search
  CPC . G06T 2207/10056; G06T 2207/10148; G06T 5/50; G06T 7/11; G06T 7/571; H04N 5/2259; H04N 5/232133; H04N 5/23293; H04N 5/2356
  See application file for complete search history.

(56) References Cited

U.S. PATENT DOCUMENTS

| | | | | |
|---|---|---|---|---|
| 2003/0197925 | A1* | 10/2003 | Hamborg | G02B 21/244 359/383 |
| 2003/0228053 | A1* | 12/2003 | Li | G06T 7/55 382/154 |
| 2004/0004614 | A1* | 1/2004 | Bacus | G02B 21/367 345/419 |
| 2004/0076315 | A1* | 4/2004 | Scoll | G06T 7/0012 382/128 |
| 2004/0131348 | A1* | 7/2004 | Ohba | G02B 7/08 396/432 |
| 2004/0264765 | A1* | 12/2004 | Ohba | G02B 21/22 382/154 |
| 2005/0100245 | A1* | 5/2005 | Chen | G02B 7/34 382/294 |
| 2005/0270639 | A1* | 12/2005 | Miki | G02B 21/0088 359/381 |
| 2006/0239507 | A1* | 10/2006 | Schenck | G01B 21/045 382/103 |
| 2007/0070498 | A1* | 3/2007 | Endo | G02B 21/367 359/434 |
| 2008/0149867 | A1* | 6/2008 | Konishi | G02B 21/0064 250/582 |
| 2010/0141752 | A1* | 6/2010 | Yamada | G01N 1/312 348/79 |
| 2010/0321484 | A1* | 12/2010 | Kishima | G02B 21/365 348/79 |
| 2012/0007977 | A1* | 1/2012 | Yamamoto | G02B 21/367 348/79 |
| 2012/0212599 | A1 | 8/2012 | Murakami | |
| 2013/0088634 | A1 | 4/2013 | Kishima et al. | |
| 2014/0022236 | A1* | 1/2014 | Liu | G02B 21/367 345/419 |
| 2015/0310613 | A1 | 10/2015 | Murakami | |
| 2015/0324997 | A1 | 11/2015 | Murakami | |

FOREIGN PATENT DOCUMENTS

| | | |
|---|---|---|
| JP | 2013-250430 A | 12/2013 |
| JP | 2014-021489 A | 2/2014 |
| JP | 2014-021490 A | 2/2014 |
| JP | 2014-026233 A | 2/2014 |
| JP | 2015-057682 A | 3/2015 |
| WO | WO 2011/158498 A1 | 12/2011 |

\* cited by examiner

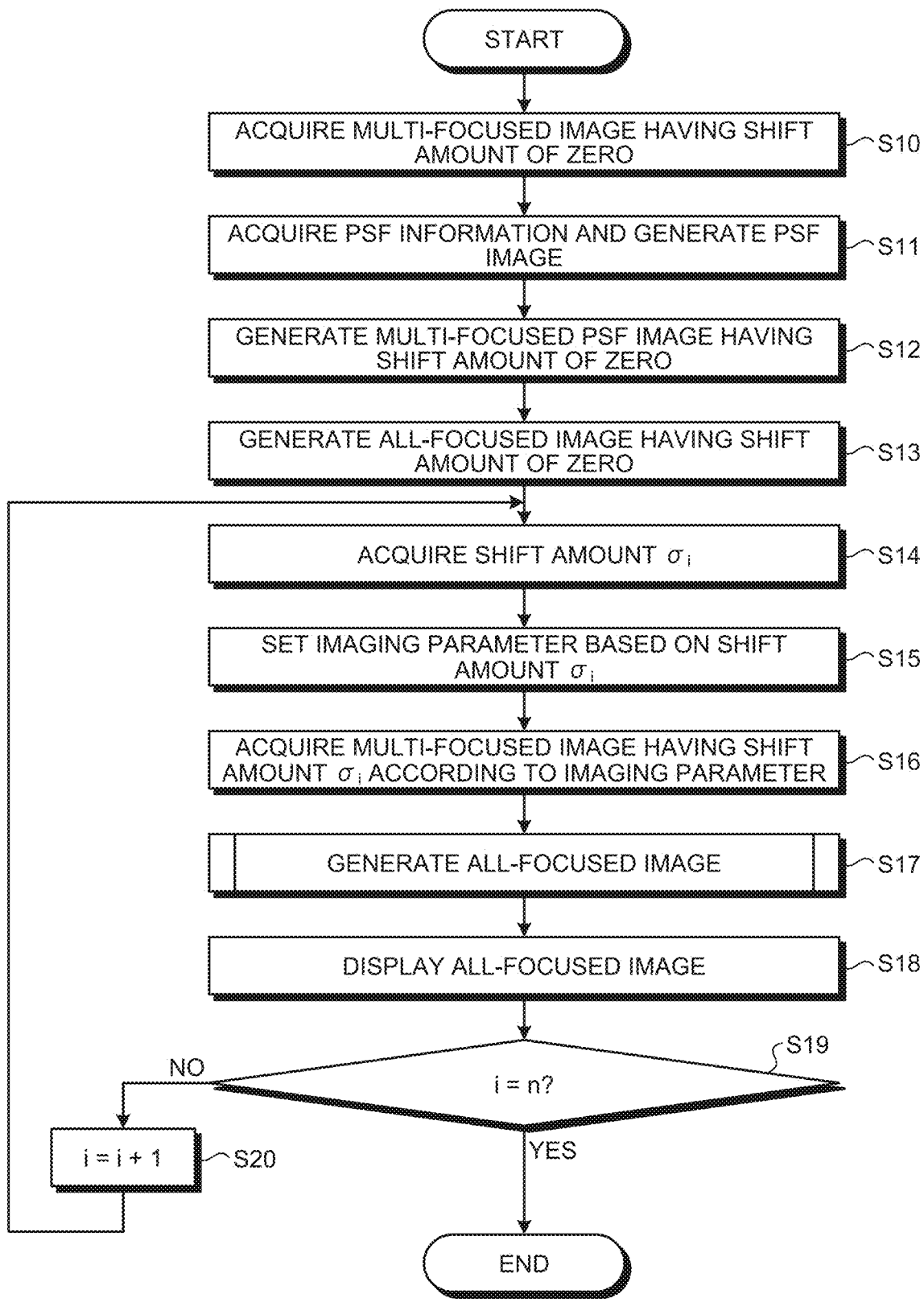

Al-21

Al-22

$Al_{+31}$ $Al_{+32}$

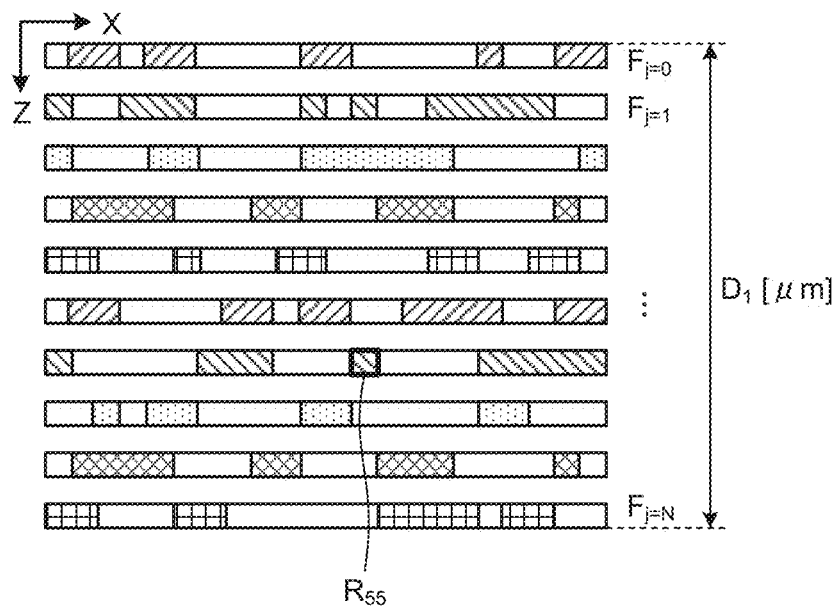
FIG.37A
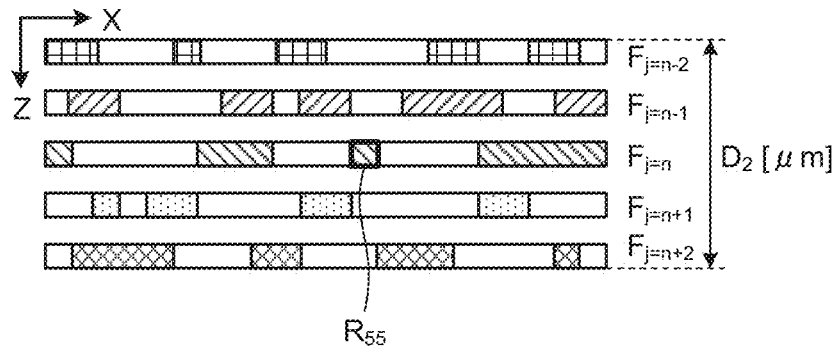
FIG.37B
FIG.38
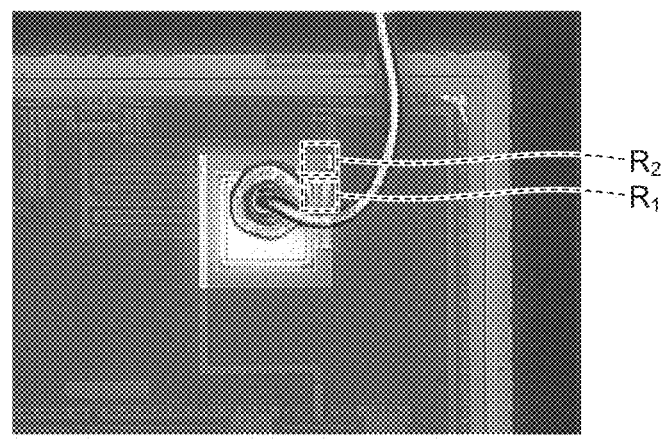

MICROSCOPY SYSTEM, MICROSCOPY METHOD, AND COMPUTER READABLE RECORDING MEDIUM

CROSS-REFERENCE TO RELATED APPLICATION

This application is a continuation of International Application No. PCT/JP2015/084448, filed on Dec. 8, 2015, the entire contents of which are incorporated herein by reference.

BACKGROUND

The present disclosure relates to a microscopy system, a microscopy method, and a computer readable recording medium.

In observation of a subject having a height difference by use of an industrial microscope, or in observation of a subject having a thickness, such as a cell nucleus or a stem cell, by use of a biological microscope having a focal depth of several ten micrometers; there is a user need for quick identification of a region of interest present in a depth direction (Z direction) along the optical axis of the observation optical system. For this need, there is a method, in which plural images having different focal planes are acquired by sequential imaging being performed while the focal plane of the observation optical system is shifted along the optical axis, and these plural images are displayed by being arranged three-dimensionally. By this three-dimensional display, three-dimensional information is able to be observed from an arbitrary direction, and the position of a region of interest is able to be checked. The plural images with the different focal planes acquired as described above are collectively called Z-stack images.

However, when plural focused structures are present in the depth direction like in a transparent subject or a subject having a height difference, by the conventionally three-dimensional display, a state, in which another structure present more shallowly in the observation direction or a blur due to an out-of-focus position hides a structure that is in the background (occlusion), is caused, and thus there is a region where its structure is unable to be directly (intuitively) seen. When occlusion is caused, an image, which has been captured at a position where a structure desired to be observed is present, needs to be searched for and checked two-dimensionally. There is also a method, in which a three-dimensional position is checked by display of only a structure having the maximum luminance in the depth direction, but this method has a problem that structures not having the maximum luminance are not reproduced.

Therefore, a method, in which a search is performed in the depth direction after presence and X-Y positions of two-dimensionally overlapping structures are checked by generation of an all-focused image from Z-stack images, may be used. Methods of generating an all-focused image include: a method of reconstructing a multi-focused image synthesized by superimposition of Z-stack images; and a method of extracting a focused area in each of Z-stack images and synthesizing the focused areas. Such an all-focused image is useful for screening of plural structural arrangements present in the depth direction.

For example, in Japanese Patent Application Laid-open No. 2014-021490, a method, in which an area desired to be observed is selected by use of a user interface, from an all-focused image generated from Z-stack images, and Z-stack images that are in focus are extracted and displayed based on in-focus-ness, is disclosed.

Further, in Japanese Patent Application Laid-open No. 2014-021489, a method, in which in-focus-ness is calculated in Z-stack images, extraction candidates are selected based on in-focus-ness in the depth direction, weighting according to the in-focus-ness is executed, and synthesis is performed, is disclosed. According to Japanese Patent Application Laid-open No. 2014-021489, a depth map is able to be generated based on a peak of in-focus-ness at each X-Y position, and a Z-position of a peak of in-focus-ness is able to be known from this depth map.

Further, in International Publication WO No. 2011/158498, a technique, in which two images respectively focused at a near end side and a far end side of a subject, and an all-focused image generated by imaging being executed while an image sensor is swept from the near end side to the far end side of the subject, are acquired, the images respectively focused at the near end side and the far end side are reconstructed from the all-focused image, thereby an amount of blurring in a partial area in an image is calculated, and thereby a distance from the optical system to the subject is acquired and a distance map is generated, is disclosed.

SUMMARY

A microscopy system according to one aspect of the present disclosure includes: an imaging unit configured to capture a subject image generated by an observation optical system of a microscope, and acquire an image; a shifting unit configured to shift positions of a focal plane and a field of view of the observation optical system; an imaging control unit configured to cause the imaging unit to acquire a multi-focused image including image information in plural planes in an optical axis direction of the observation optical system, by shifting the positions of the focal plane and the field of view in one exposure period of the imaging unit; a shift amount acquisition processing unit configured to acquire a shift amount, by which the position of the field of view is shifted; an all-focused image generating unit configured to respectively generate plural all-focused images, based on plural multi-focused images respectively acquired under plural conditions where the shift amounts differ, and on blurring information of images according to the shift amounts; and a display unit configured to consecutively display the plural all-focused images generated by the all-focused image generating unit.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 3 is a flow chart illustrating operation of the microscopy system illustrated in FIG. 1;

FIG. 37A and FIG. 37B are schematic diagrams for explanation of processing for acquisition of multi-focused images according to a modified example of the second embodiment; and FIG. 38 is a schematic diagram for explanation of a setting screen for image acquisition in processing for acquisition of a multi-focused image according to a third embodiment.

DETAILED DESCRIPTION OF THE PREFERRED EMBODIMENTS

Hereinafter, embodiments of a microscopy system, a microscopy method, and a microscopy program, according to the present disclosure, will be described in detail, while reference is made to the drawings. The present disclosure is not limited by these embodiments. Further, the same reference signs are used for reference to the same portions, throughout the drawings.

First Embodiment

Figure 1:
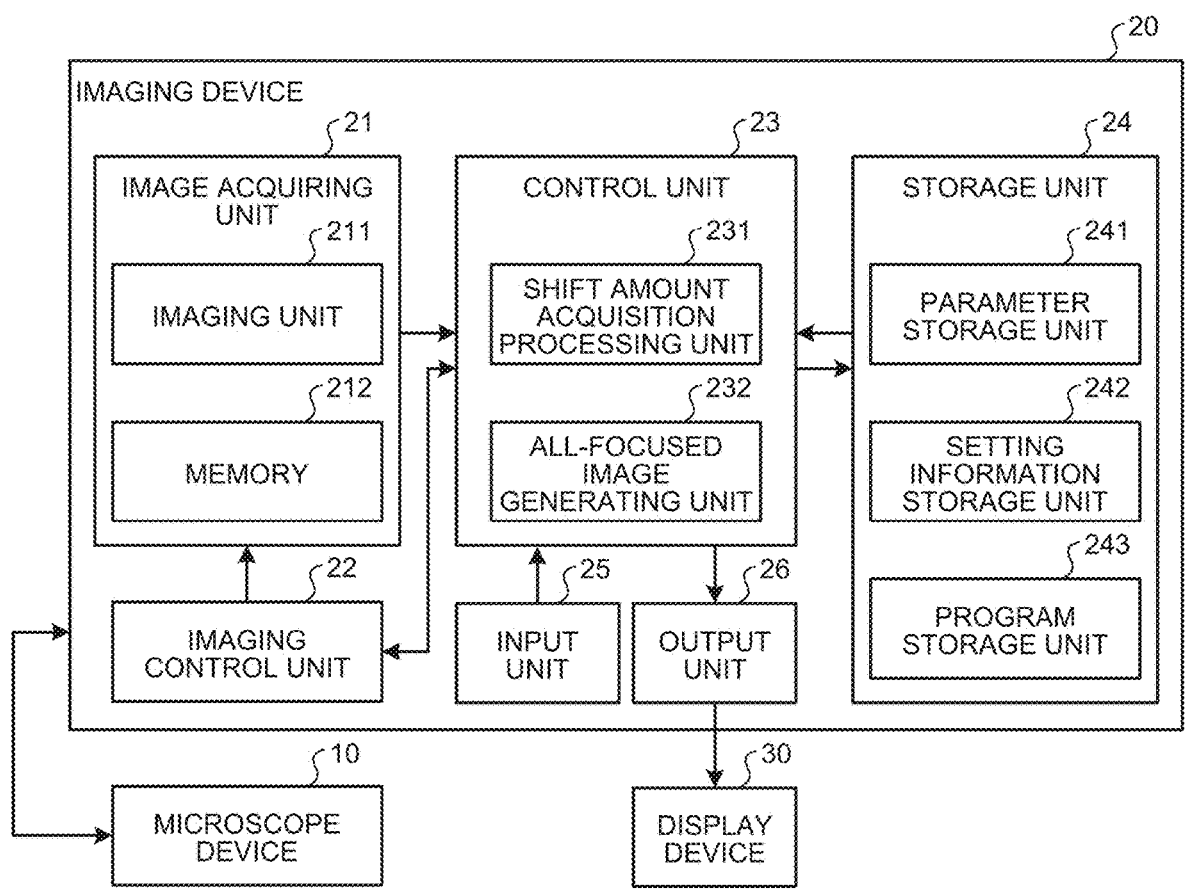
FIG. 1 is a block diagram illustrating an example of a configuration of a microscopy system according to a first embodiment.

FIG. 1 is a block diagram illustrating an example of a configuration of a microscopy system according to a first embodiment. As illustrated in FIG. 1, a microscopy system 1 according to the first embodiment includes: a microscope device 10 that generates a subject image; an imaging device 20 that acquires and processes an image of an enlarged image generated by the microscope device 10; and a display device 30 that displays thereon the image processed by the imaging device 20.

Figure 2:
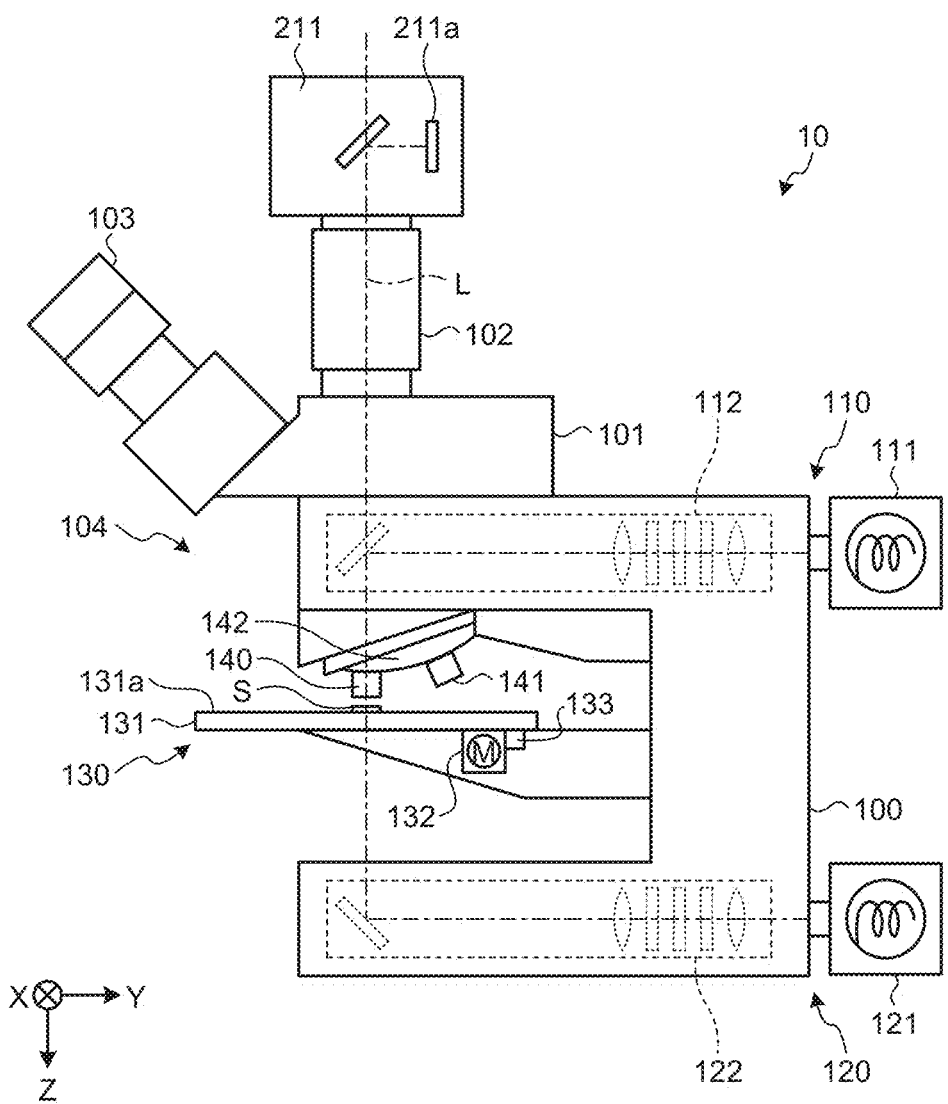
FIG. 2 is a schematic diagram illustrating an example of a configuration of a microscope device illustrated in FIG. 1.

FIG. 2 is a schematic diagram illustrating an example of a configuration of the microscope device 10. As illustrated in FIG. 2, the microscope device 10 includes: an arm 100 that is approximately C-shaped; a lens barrel 102 and an eyepiece unit 103 that are supported on the arm 100 via a trinocular lens barrel unit 101; an epi-illumination unit 110 and a transmitting illumination unit 120 that are provided in the arm 100; an electrically driven stage unit 130 including a stage 131 where a subject S is placed; and an objective lens 140 that is provided at one end of the lens barrel 102 via the trinocular lens barrel unit 101 so as to oppose the stage 131, and that forms an image of observation light from the subject S. The objective lens 140, the lens barrel 102 connected via the trinocular lens barrel unit 101, and an imaging unit 211 (described later) provided at the other end of the lens barrel 102 form an observation optical system (imaging optical system) 104.

The trinocular lens barrel unit 101 causes the observation light entering from the objective lens 140 to be branched to the eyepiece unit 103 for direct observation of the subject S by a user, and to the imaging unit 211 described later.

The epi-illumination unit 110 includes an epi-illumination light source 111 and an epi-illumination optical system 112, and irradiates the subject S with epi-illumination light. The epi-illumination optical system 112 includes various optical members that condense illumination light emitted from the epi-illumination light source 111, and guide the condensed illumination light in a direction of an optical axis L of the observation optical system 104, the various optical members including, specifically, a filter unit, a shutter, a field stop, and an aperture diaphragm.

The transmitting illumination unit 120 includes a transmitting illumination light source 121 and transmitting illumination optical system 122, and irradiates the subject S with transmitting illumination light. The transmitting illumination optical system 122 includes various optical members that condense illumination light emitted from the transmitting illumination light source 121, and guide the condensed illumination light in the direction of the optical axis L, the various optical members including, specifically, a filter unit, a shutter, a field stop, and an aperture diaphragm.

Either of these epi-illumination unit 110 and transmitting illumination unit 120 is selected and used, according to microscopy. Only one of the epi-illumination unit 110 and the transmitting illumination unit 120 may be provided in the microscope device 10.

The electrically driven stage unit 130 includes the stage 131, a stage drive unit 132 that moves the stage 131, and a position detecting unit 133. The stage drive unit 132 is formed of, for example, a motor. A subject placement surface 131a of the stage 131 is provided to be orthogonal to the optical axis of the objective lens 140. Hereinafter, the subject placement surface 131a will be referred to as an X-Y plane, and a normal direction of the X-Y plane, that is, a direction parallel to the optical axis, will be referred to as a Z direction. Along the Z direction, a downward direction in the figure, that is, a direction, in which the stage 131 (subject placement surface 131a) goes away from the objective lens 140, will be referred to as a plus direction.

By the stage 131 being moved in the X-Y plane, a position of a field of view of the objective lens 140 is able to be shifted. Further, by the stage 131 being moved in the Z direction, a focal plane of the objective lens 140 is able to be shifted along the optical axis L. That is, the electrically driven stage unit 130 is a shifting means that shifts positions of the focal plane and the field of view by moving the stage 131 under control by an imaging control unit 22 described later.

In FIG. 2, for the shifting of the positions of the focal plane and the field of view, a position of the observation optical system 104 including the lens barrel 102 to the objective lens 140 is fixed and the stage 131 is moved; but a position of the stage 131 may be fixed, and the observation optical system 104 may be moved. Or, both the stage 131 and the observation optical system 104 may be moved in mutually opposite directions. That is, as long as the observation optical system 104 and the subject S are configured to be movable relatively to each other, any configuration may be adopted. Further, the shifting of the focal plane may be performed by movement of the observation optical system 104 in the Z direction, and the shifting of the position of the field of view V may be performed by movement of the stage 131 in the X-Y plane.

The position detecting unit 133 is formed of an encoder that detects an amount of rotation of the stage drive unit 132 formed of, for example, a motor, and detects a position of the stage 131 and outputs a detection signal. Instead of the stage drive unit 132 and the position detecting unit 133, a pulse generating unit, which generates a pulse according to control by the imaging control unit 22 described later, and a stepping motor, may be provided.

The objective lens 140 is installed in a revolver 142 that is able to hold plural objective lenses (for example, the objective lens 140 and an objective lens 141) having magnifications different from one another. By this revolver 142 being rotated for change between the objective lenses 140 and 141 opposing the stage 131, imaging magnifications are able to be changed. FIG. 2 illustrates a state where the objective lens 140 opposes the stage 131.

With reference to FIG. 1 again, the imaging device 20 includes: an image acquiring unit 21 that acquires an image by capturing a subject image generated by the observation optical system 104 of the microscope device 10; the imaging control unit 22 that controls imaging operation of the image acquiring unit 21; a control unit 23 that controls various types of operation in the imaging device 20 and processes the image acquired by the image acquiring unit 21; a storage unit 24 that stores therein various types of information, such as image data of the image acquired by the image acquiring unit 21 and a control program; an input unit 25 for input of an instruction and information to the imaging device 20; and an output unit 26 that outputs an image based on the image data stored in the storage unit 24 and various other types of information, to an external device.

The image acquiring unit 21 includes the imaging unit 211 and a memory 212. The imaging unit 211 includes an imager 211a formed of, for example, a CCD or a CMOS, and is formed by use of a camera that is able to capture a color image having a pixel level (pixel value) in each of R (red), G (green), and B (blue) bands at each pixel included in the imager 211a. Or, the imaging unit 211 may be formed by use of a camera that is able to capture a monochrome image, through which a luminance value Y is output as a pixel level (pixel value) at each pixel.

As illustrated in FIG. 2, the imaging unit 211 is provided at one end of the lens barrel 102 such that the optical axis L passes through the center of a light receiving surface of the imager 211a; and the imaging unit 211 generates image data of a subject image that has entered a field of view of the objective lens 140, by photoelectrically converting observation light incident on the light receiving surface via the observation optical system 104 including the objective lens 140 to the lens barrel 102.

The memory 212 is formed of a recording device, such as, for example, an updatingly recordable flash memory, or a semiconductor memory, like a RAM or a ROM, and temporarily stores therein the image data generated by the imaging unit 211.

By outputting a control signal to the microscope device 10 and moving the stage 131 in one exposure period of the imaging unit 211, the imaging control unit 22 shifts the positions of the focal plane and the field of view of the objective lens 140, and thereby executes control of causing a multi-focused image to be acquired, the multi-focused image including image information in plural planes, which are in the direction of the optical axis L of the observation optical system 104.

The control unit 23 is formed of hardware, such as, for example, a CPU, and integrally controls operation of the imaging device 20 and the whole microscopy system 1, based on various parameters stored in the storage unit 24 and information or the like input from the input unit 25, by reading a program stored in the storage unit 24. Further, the control unit 23 executes processing for generation of an all-focused image by performing predetermined image processing on image data input from the image acquiring unit 21, and executes control of causing a display device 30 to display thereon the generated all-focused image.

In detail, the control unit 23 includes: a shift amount acquisition processing unit 231 that acquires a shift amount, by which the position of the field of view of the observation optical system 104 is shifted when a multi-focused image is acquired; and an all-focused image generating unit 232 that generates an all-focused image by reconstructing a multi-focused image by using a point spread function (PSF) representing blurring in an image.

The storage unit 24 is formed of: a recording device, such as an updatingly recordable flash memory, or a semiconductor memory like a RAM, or a ROM; or a recording medium such as a hard disk, an MO, a CD-R, or a DVD-R, which is of a built-in type or is connected via a data communication terminal, and a writing and reading device that writes information into the recording medium and reads information recorded in the recording medium. The storage unit 24 includes: a parameter storage unit 241 that stores therein parameters used in calculation by the control unit 23; a setting information storage unit 242; and a program storage unit 243 that stores therein various programs. Among these, the parameter storage unit 241 stores therein a parameter, such as a shift amount, by which the position of the field of view is shifted when a multi-focused image is acquired. Further, the program storage unit 243 stores therein a control program for causing the imaging device 20 to execute predetermined operation, an image processing program, and the like.

The input unit 25 is formed of: an input device, such as a keyboard, various buttons, or various switches; a pointing device, such as a mouse or a touch panel; and the like, and the input unit 25 inputs signals according to operations performed on these devices, to the control unit 23.

The output unit 26 is an external interface that outputs an image based on image data acquired by the image acquiring unit 21, an all-focused image generated by the control unit 23, and various other types of information, to an external device, such as the display device 30, and causes the external device to display them in a predetermined format.

This imaging device 20 may be formed by combination of, for example, a general-purpose device, such as personal computer or a work station, with a general-purpose digital camera, via an external interface.

The display device 30 is formed of, for example, an LCD, an EL display, or a CRT display, and displays thereon an image and related information output from the output unit 26. In this first embodiment, the display device 30 is provided outside the imaging device 20, but the display device 30 may be provided inside the imaging device 20.

Next, operation of the microscopy system 1 will be described. FIG. 3 is a flow chart illustrating the operation of the microscopy system 1.

Firstly, at Steps S10 to S16, the image acquiring unit 21 acquires plural multi-focused images having different shift amounts. FIG. 4A to FIG. 4E are schematic diagrams for explanation of processing for the acquisition of plural multi-focused images. Hereinafter, as illustrated in FIG. 4A to FIG. 4E, a case, in which superimposed imaging is performed over a range of a thickness D (μm) in the subject S, will be described. This range of the thickness D will be referred to as a superimposed imaging range. In FIG. 4A to FIG. 4E, the superimposed imaging range is illustrated by being divided into plural slices $F_j$ (j=0 to N). In the first embodiment, a thickness $\Delta z$ of each slice $F_j$ corresponds to a depth of field of the observation optical system 104. Further, a region surrounded by a bold line in each slice $F_j$ is the field of view V of the observation optical system 104, the field of view V being a target to be imaged, and an arrow illustrated by being overlapped with the field of view V indicates a direction in which the positions of the focal plane and the field of view are shifted.

Figure 4A:
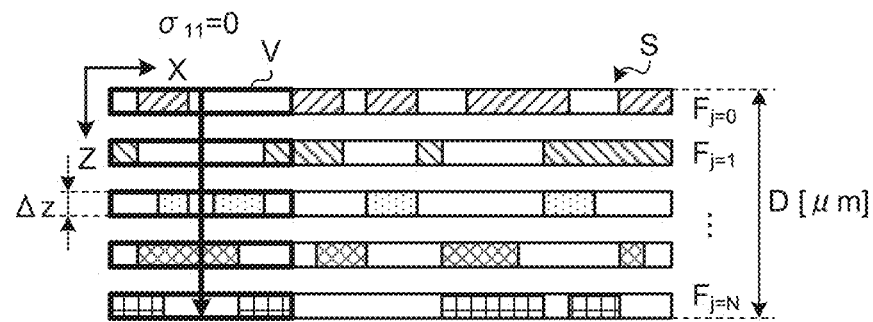
FIG. 4A to FIG. 4E are schematic diagrams for explanation of processing for acquisition of plural multi-focused images.

It is assumed that at start of processing of Step S10, as illustrated in FIG. 4A, the focal plane of the observation optical system 104 is positioned at a slice $F_0$ that is at a Z-position desired by a user, and the field of view V is positioned at an X-Y position desired by the user. This positioning may be performed manually by the user, or may be executed by automatic control.

At Step S10, the image acquiring unit 21 acquires a multi-focused image having a shift amount of zero ($\sigma_{11}$=0). In detail, as illustrated in FIG. 4A, exposure in the imaging unit 211 is started under control by the imaging control unit 22, and the focal plane of the observation optical system 104 is moved by the thickness D in the +Z direction in one exposure period. Thereby, a multi-focused image $SI_{11}$ having images superimposed with one another is acquired, the images being in the field of view V at the same X-position in the slices $F_0$ to $F_N$.

Thereafter, at Step S11, the all-focused image generating unit 232 acquires point spread function (PSF) information representing image blurring in the image of each slice $F_j$, and generates a PSF image based on this PSF information. A point spread function is stored in the parameter storage unit 241 beforehand, in association with: an imaging condition, such as a magnification of the objective lens 140 in the microscope device 10; and a slice $F_j$. The all-focused image generating unit 232 reads, based on an imaging condition, such as a magnification of the objective lens 140, a point spread function corresponding to a slice $F_j$ from the parameter storage unit 241, calculates, based on the point spread function, a pixel value corresponding to each pixel position in the image in the field of view V, and thereby generates a PSF image for each slice $F_j$.

At subsequent Step S12, the all-focused image generating unit 232 generates a multi-focused PSF image having a shift amount of zero, the multi-focused PSF image corresponding to the multi-focused image $SI_{11}$. In detail, by calculation of an arithmetic mean of pixel values of pixels at corresponding positions among plural PSF images respectively corresponding to the slices $F_j$ generated at Step S11, a pixel value of each pixel in the multi-focused PSF image is calculated.

At Step S13, the all-focused image generating unit 232 reconstructs the multi-focused image $SI_{11}$ generated at Step S10 by using the multi-focused PSF image. Thereby, an all-focused image is generated from the multi-focused PSF image having a shift amount of zero.

After the all-focused image having a shift amount of zero is generated at Steps S10 to S13, the shift amount acquisition processing unit 231 acquires shift amounts $\sigma_i$ (i=12, . . . , n) to be used in acquisition of plural multi-focused images (Step S14). The subscript, "i", is a variable indicating acquisition order of the multi-focused images. As illustrated in FIG. 4B to FIG. 4E, a case, in which multi-focused images having shift amounts $\sigma_{12}$ to $\sigma_{15}$, which are shift amounts $\sigma_{12}$ to $\sigma_{15}$ that are not zero and are different in magnitude, and which increase in the order of $\sigma_{12} < \sigma_{13} < \sigma_{14} < \sigma_{15}$, are acquired, will be described.

At subsequent Step S15, the imaging control unit 22 sets imaging parameters based on the shift amount $\sigma_i$ acquired at Step S14. Specifically, firstly, the imaging control unit 22 calculates, as the imaging parameters: an imaging start position; and a movement distance and a shifting velocity, by and at which the field of view V is moved to that imaging start position.

The imaging control unit 22 firstly calculates a movement distance $t_i = \sigma_i \times N$, by which the field of view is moved to the next imaging start position. Herein, N represents the number of the depths of field $\Delta z$ included in the thickness D of the superimposed imaging range. In this microscope device 10, the movement distance corresponds to movement of the stage 131 along an X direction by a distance $\sigma_i \times N \times p/M$, by use of a pixel pitch p of the imaging unit 211 and an observation magnification of M times.

Further, as the imaging parameter, the imaging control unit 22 calculates a shift velocity $v_i$, at which the field of view V is shifted along the X direction in one exposure period. The shift velocity $v_i$ is given by the following Equation (1), by use of a period $T_i$ of exposure of one time, the pixel pitch p of the imaging unit 211, the number N, and the observation magnification of M times.

$$v_i = (p \times \sigma_i / M)/(T_i/N) \quad (1)$$

At subsequent Step S16, under control by the imaging control unit 22 based on the imaging parameters set at Step S15, the image acquiring unit 21 performs imaging of the subject S while shifting the positions of the focal plane and the field of view V of the observation optical system 104 in one exposure period of the imaging unit 211, and thereby acquires a multi-focused image having the shift amount $\sigma_i$.

As illustrated in FIG. 4A to FIG. 4E, firstly, the field of view V is shifted in the X direction by the distance $t_i$ ($t_{12}$ or $t_{14}$). This position is the imaging start position of the next multi-focused image. Exposure is then started in the imaging unit 211, the field of view V is shifted in the X direction at the velocity $v_i$ in one exposure period, and the focal plane is shifted in the Z direction at a velocity $D/T_i$. Thereby, multi-focused images (multi-focused images $SI_{12}$ to $SI_{15}$) having superimposed images of the field of view V in the respective slices $F_0$ to $F_N$ are acquired. For example, if the shift amount is $\sigma_{12}$, the field of view V is shifted at a velocity $v_{12}$ in the −X direction in one exposure period, and the focal plane is shifted in the −Z direction at a velocity $D/T_{12}$. Thereby, a multi-focused image $SI_{12}$ having superimposed images of the field of view V in the respective slices $F_0$ to $F_N$ is acquired.

Figure 4B:
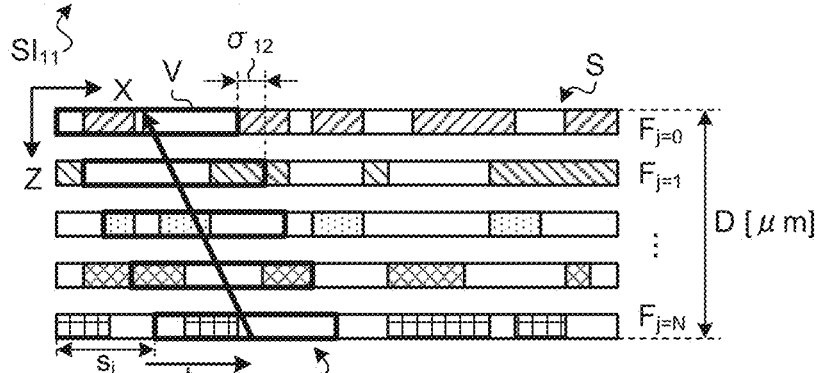

The directions in which the positions of the focal plane and the field of view V are shifted are not limited to the directions of the arrows illustrated in FIG. 4A to FIG. 4E. For example, when the multi-focused image $SI_{11}$ illustrated in FIG. 4A is acquired, the focal plane may be shifted in the −Z direction (slice $F_N$→slice $F_0$), or when the multi-focused image $SI_{12}$ illustrated in FIG. 4B is acquired, the field of view V may be shifted in the +X direction while the focal plane is shifted in the +Z direction. The order, in which the plural multi-focused images $SI_{12}$ to $SI_{15}$ are acquired, and the shift directions for the positions of the focal plane and the field of view V are preferably set such that the number of times of movement and the amount of movement of the stage 131 are made small as much as possible.

At Step S17 subsequent to Step S16, the all-focused image generating unit 232 generates an all-focused image, based on the plural multi-focused images acquired at Step S16.

Figure 5:
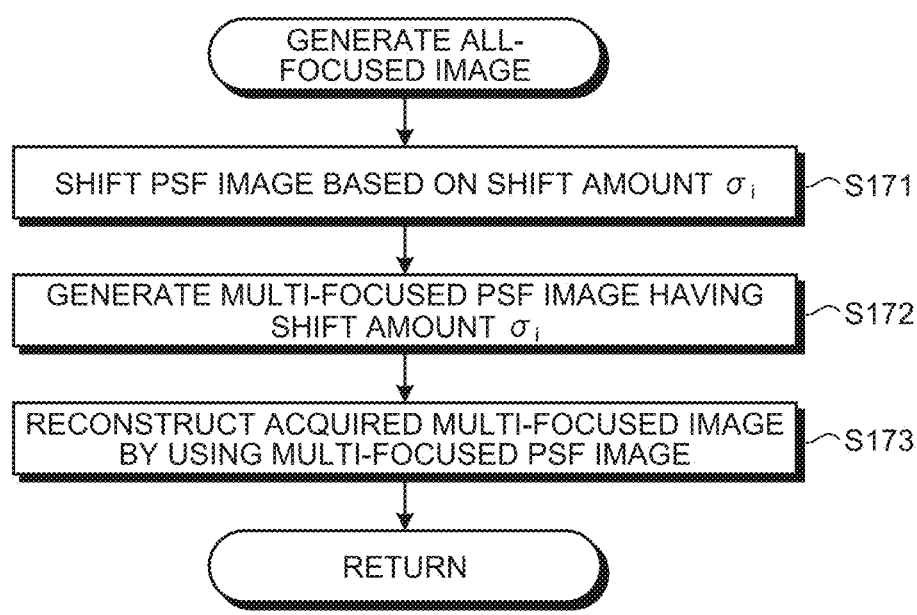
FIG. 5 is a flow chart illustrating details of processing for generation of plural all-focused images.

FIG. 5 is a flow chart illustrating details of processing for the generation of an all-focused image. At Step S171, the all-focused image generating unit 232 acquires the shift amount $\sigma_i$ used in the generation of the multi-focused image $SI_i$, and shifts the PSF image corresponding to each slice $F_j$, based on this shift amount $\sigma_i$. That is, similarly to the generation of the multi-focused image $SI_{11}$, with respect to the PSF image corresponding to the slice $F_0$ of the upper-most plane, the PSF images corresponding to the other slices $F_j$ are shifted by shift amounts $s_j = \sigma_i \times j$.

At subsequent Step S172, by using the plural PSF images that have been subjected to the shifting processing at Step S171, the all-focused image generating unit 232 generates a multi-focused PSF image $PI_i$ having the shift amount $\sigma_i$. In detail, by calculation of an arithmetic mean of pixel values of pixels at corresponding positions among the plural PSF images that have been subjected to the shifting processing, a pixel value of each pixel in the multi-focused PSF image $PI_i$ is calculated.

At Step S173, the all-focused image generating unit 232 reconstructs the multi-focused image $SI_i$ acquired at Step S16, by using the multi-focused PSF image $PI_i$. Thereby, an all-focused image $AI_i$ is generated from the multi-focused image $SI_i$. Thereafter, the operation of the control unit 23 returns to the main routine.

At Step S18 subsequent to Step S17, the imaging device 20 outputs image data of the all-focused image generated at Step S17, to the display device 30, and causes the display device 30 to display this all-focused image. The all-focused image having a shift amount of zero generated at Step S13 may be displayed after Step S13, or may be displayed at Step S18.

At Step S19 subsequent to Step S18, the control unit 23 determines whether or not the variable i has reached a maximum value n. If the variable i has not reached the maximum value n (Step S19: No), the control unit 23 increments the variable i (Step S20). Thereafter, the operation of the control unit 23 returns to Step S14. By repetition of Steps S14 to S18 described above, the plural multi-focused images $SI_i$ having different shift amounts $\sigma_i$ are acquired, and are sequentially displayed on the display device 30. Further, if the variable i has reached the maximum value n (Step S19: Yes), the control unit 23 ends the operation for generation and display of all-focused images.

By appropriate setting of the imaging parameters controlling the acquisition order of the multi-focused images $SI_i$, the imaging start positions, and the shift directions of the positions of the focal plane and the field of view V; the multi-focused images $SI_i$ are able to be efficiently acquired with the amount of movement of the stage 131 being kept small and the total imaging time being shortened.

Figure 4C:
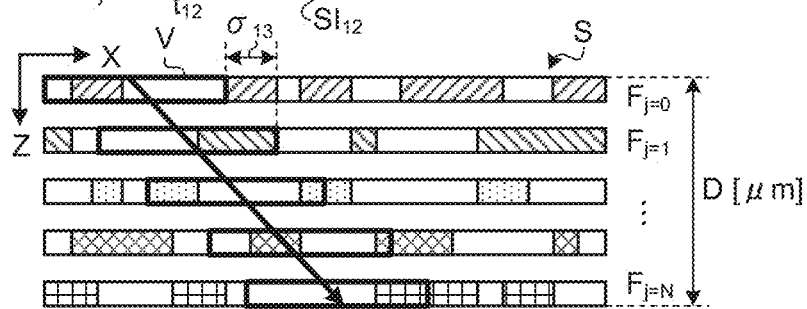
Figure 4D:
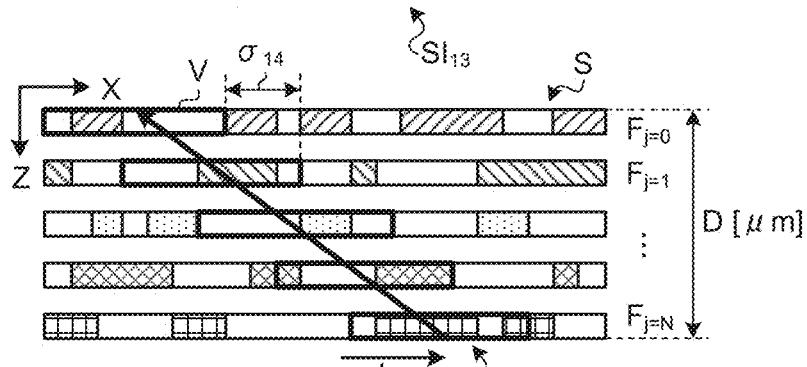
Figure 4E:
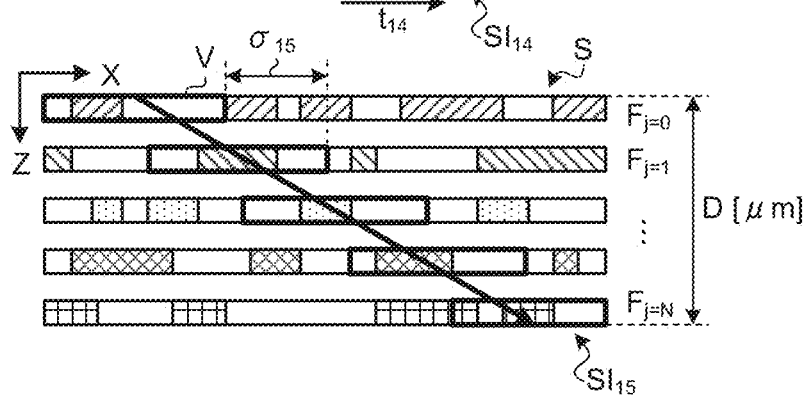

Specifically, firstly, as illustrated in FIG. 4A, by the focal plane being shifted in the +Z direction in one exposure period, the multi-focused image $SI_{11}$ having the shift amount $\sigma_{11}=0$ is acquired. Subsequently, as illustrated in FIG. 4B, by exposure being started after the imaging start position has been moved in the +X direction by a distance $t_{12}$ ($t_{12}=\sigma_{12}\times N$), and the field of view V being shifted in the −X direction by a pace of the shift amount $\sigma_{12}$ while the focal plane is shifted in the −Z direction; the multi-focused image $SI_{12}$ is acquired. Subsequently, as illustrated in FIG. 4C, by exposure being started at the immediately preceding imaging end position, and the field of view V being shifted in the +X direction by a pace of the shift amount $\sigma_{13}$ while the focal plane is shifted in the −Z direction; the multi-focused image $SI_{13}$ is acquired. Subsequently, as illustrated in FIG. 4D, by exposure being started after the imaging start position has been moved in the +X direction by the distance $t_{14}$ ($t_{14}=\sigma_{14}\times N - \sigma_{13}\times N$), and the field of view V being shifted in the −X direction by a pace of the shift amount $\sigma_{14}$ while the focal plane is shifted in the −Z direction; the multi-focused image $SI_{14}$ is acquired. Further, as illustrated in FIG. 4E, by exposure being started at the immediately preceding imaging end position, and the field of view V being shifted in the +X direction by a pace of the shift amount $\sigma_{15}$ while the focal plane is shifted in the +Z direction; the multi-focused image $SI_{15}$ is acquired.

Figure 6:
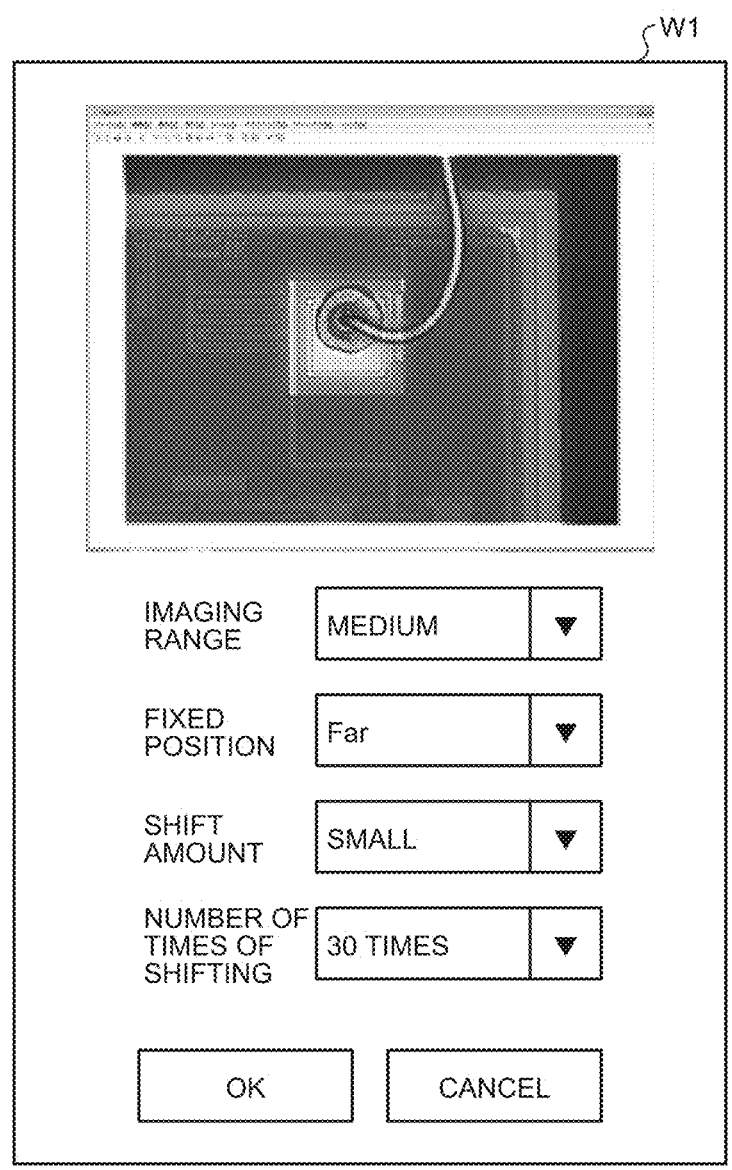
FIG. 6 is a schematic diagram for explanation of a setting screen for image acquisition in processing for acquisition of a multi-focused image.

The imaging range in the Z-direction, the non-shifted Z-position, the shift amount, and the number of times of shifting may be made settable by a user. FIG. 6 is a schematic diagram for explanation of a setting screen for image acquisition in processing for acquisition of a multi-focused image. On a setting screen W1 illustrated in FIG. 6, for example, an all-focused image having a shift amount of zero is displayed, and images for setting of an imaging range in the Z-direction, a non-shifted Z-position, a shift amount, and the number of times of shifting are displayed. On the setting screen W1, for each setting parameter, a pulldown list is set, and by selection of a desired numerical value from the pulldown list, the parameter described above is able to be set. As to PSF information also, shift information is set based on the information set on the setting screen W1.

For example, for setting of the imaging range in the Z direction, any one of large, medium, and small depths of field may be set, for example. For setting of the non-shifted Z-position, for example, whether a fixed position in the Z-direction is to be set at a near side or a far side may be selected. For setting of the shift amount, for example, any one of large, medium, and small shift amounts may be selected. For setting of the number of times of shifting, for example, any one of 20, 30, and 40 may be selected as the number of times of shifting.

Figure 7:
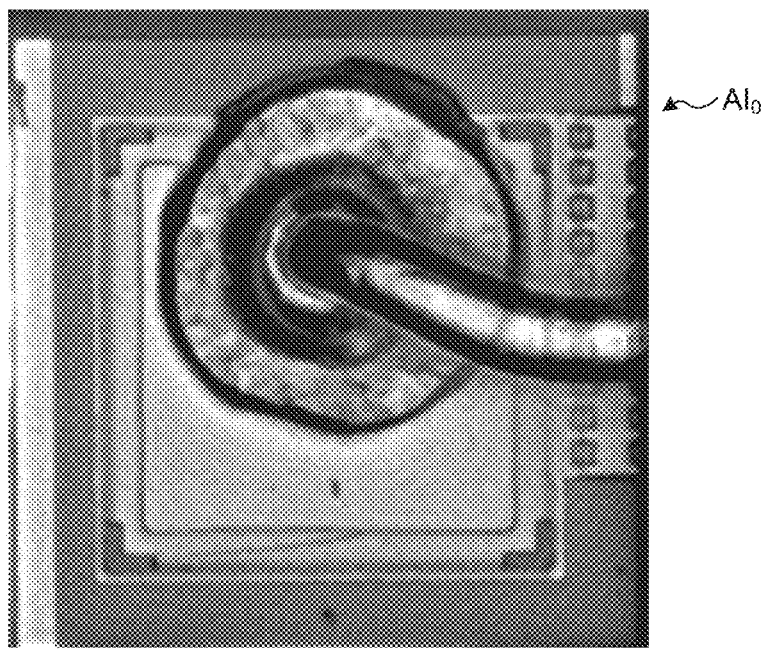
FIG. 7 is a diagram illustrating an example of an all-focused image to be displayed on a display device illustrated in FIG. 1.
Figure 8:
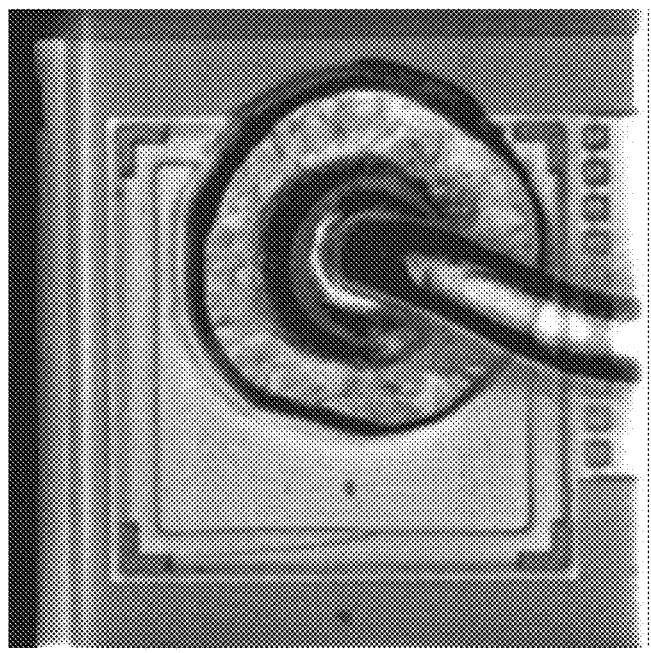
FIG. 8 is a diagram illustrating an example of an all-focused image to be displayed on the display device illustrated in FIG. 1.
Figure 9:
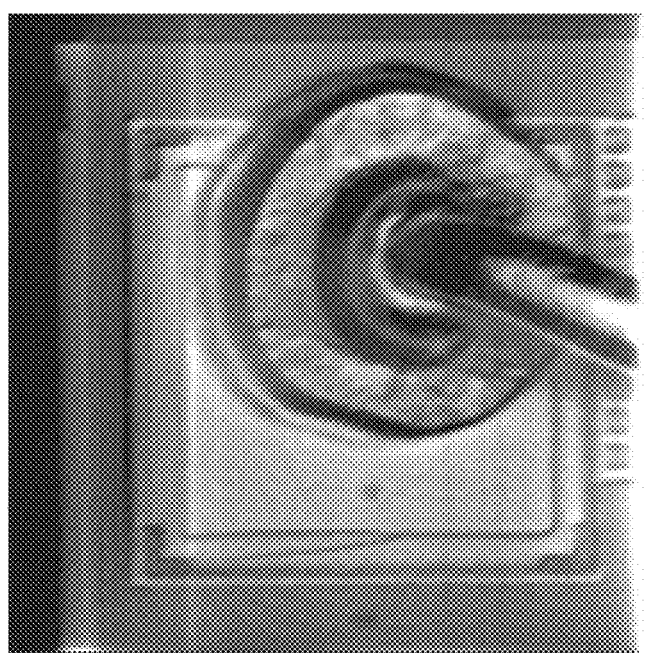
FIG. 9 is a diagram illustrating an example of an all-focused image to be displayed on the display device illustrated in FIG. 1.
Figure 10:
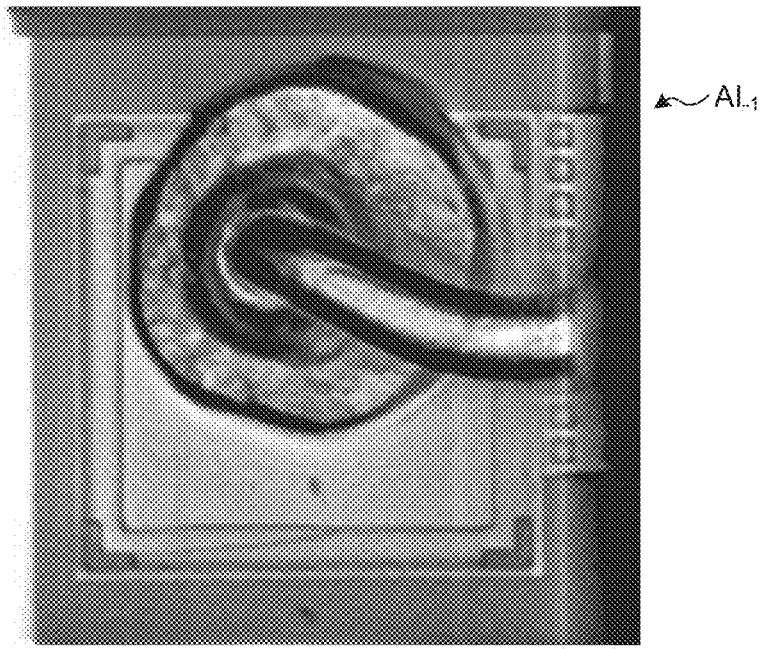
FIG. 10 is a diagram illustrating an example of an all-focused image to be displayed on the display device illustrated in FIG. 1.
Figure 11:
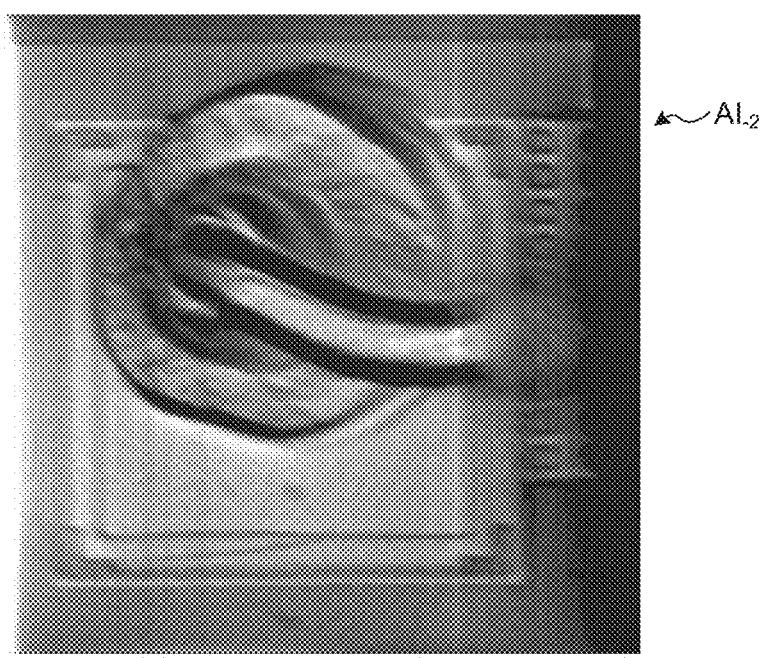
FIG. 11 is a diagram illustrating an example of an all-focused image to be displayed on the display device illustrated in FIG. 1.

FIG. 7 is a diagram illustrating an example of an all-focused image to be displayed on the display device 30, and is a diagram illustrating an all-focused image $AI_0$ when the shift amount is zero. FIG. 8 is a diagram illustrating an example of an all-focused image to be displayed on the display device 30, and is a diagram illustrating an all-focused image $AI_{+1}$ when shifting is executed in the +X direction by a shift amount $\sigma_1$ (>0). FIG. 9 is a diagram illustrating an example of an all-focused image to be displayed on the display device 30, and is a diagram illustrating an all-focused image $AI_{+2}$ when shifting is executed in the +X direction by a shift amount $\sigma_2$ (>$\sigma_1$). FIG. 10 is a diagram illustrating an example of an all-focused image to be displayed on the display device 30, and is a diagram illustrating an all-focused image $AI_{-1}$ when shifting is executed in the −X direction by the shift amount $\sigma_1$. FIG. 11 is a diagram illustrating an example of an all-focused image to be displayed on the display device 30, and is a diagram illustrating an all-focused image $AI_{-2}$ when shifting is executed in the −X direction by the shift amount $\sigma_2$. The all-focused image $AI_0$ corresponds to the above described all-focused image $AI_{11}$. The display device 30 sequentially (consecutively) displays, in the same display area, the plural all-focused images $AI_0$, $AI_{+1}$, $AI_{+2}$, $AI_{-1}$, and $AI_{-2}$ generated, in chronological order. Under control by the control unit 23, the display device 30 displays the all-focused images, in the order of: the all-focused image $AI_0$; the all-focused image $AI_{+1}$; the all-focused image $AI_{+2}$; the all-focused image $AI_{-1}$; and the all-focused image $AI_{-2}$. The above described all-focused images are just a part excerpted from all-focused images, and plural all-focused images actually exist between the respective images and are consecutively displayed.

As described above, in the first embodiment, since the magnitude of the shift amount $\sigma_i$ is changed among the plural multi-focused images $SI_i$; a state where the subject S is virtually observed from plural directions of a wider range is able to be reproduced and displayed as all-focused images consecutively on the display device 30. Therefore, a user is able to grasp the Z direction position of a structure in the subject S, how the structures overlap one another, and the front and back relations among the structures, intuitively and more realistically.

Further, according to the above described first embodiment, since a multi-focused image is acquired by imaging being performed with the focal plane being moved in one exposure period: as compared to a case, in which a multi-focused image is acquired by acquisition of Z-stack images acquired through a plural number of times of imaging, and calculation of arithmetic means of these Z-stack images; imaging is able to be executed in a short period of time, and the amount of data and the amount of calculation in image processing are able to be reduced significantly.

These shift amounts $\sigma_i$ may be preset amounts, or may be acquired based on information input through the input unit 25 according to user operations. When a shift amount $\sigma_i$ is determined according to a user operation, an angle of inclination of a line of sight of the user with respect to the upright direction of the subject S may be input. In this case, when a pixel pitch of the imaging unit 211 is p (μm/pixel) and the input angle is $\theta_i$, the shift amount $\sigma_i$ (pixels) is given by the following Equation (2) by use of the pixel pitch p of the imaging unit 211 and the distance Z (approximate value) from the objective lens 140 to each depth in the subject S.

$$\sigma_i=(Z/\tan \theta_i)/p \qquad (2)$$

In Equation (2), the distance Z may be approximated by the distance from the objective lens 140 to each depth in the subject S.

In the above described first embodiment, in the processing for acquisition of plural multi-focused images having different shift amounts, the processing for the shift amount of zero ($\sigma_{11}=0$) is executed first, but the image having the shift amount of zero may be acquired in the middle of the sequential change of the shift amount. In the above described first embodiment, the shift amounts include zero ($\sigma_{11}=0$) (Steps S10 to S13), but not being limited thereto, the shift amounts may not include zero. In that case, by the processing from Step S14 to Step S20 being executed, all-focused images are able to be generated and displayed. Therefore, even if the shift amounts do not include zero (σ≠0), the above described effects are able to be achieved.

First Modified Example of First Embodiment

Figure 12:
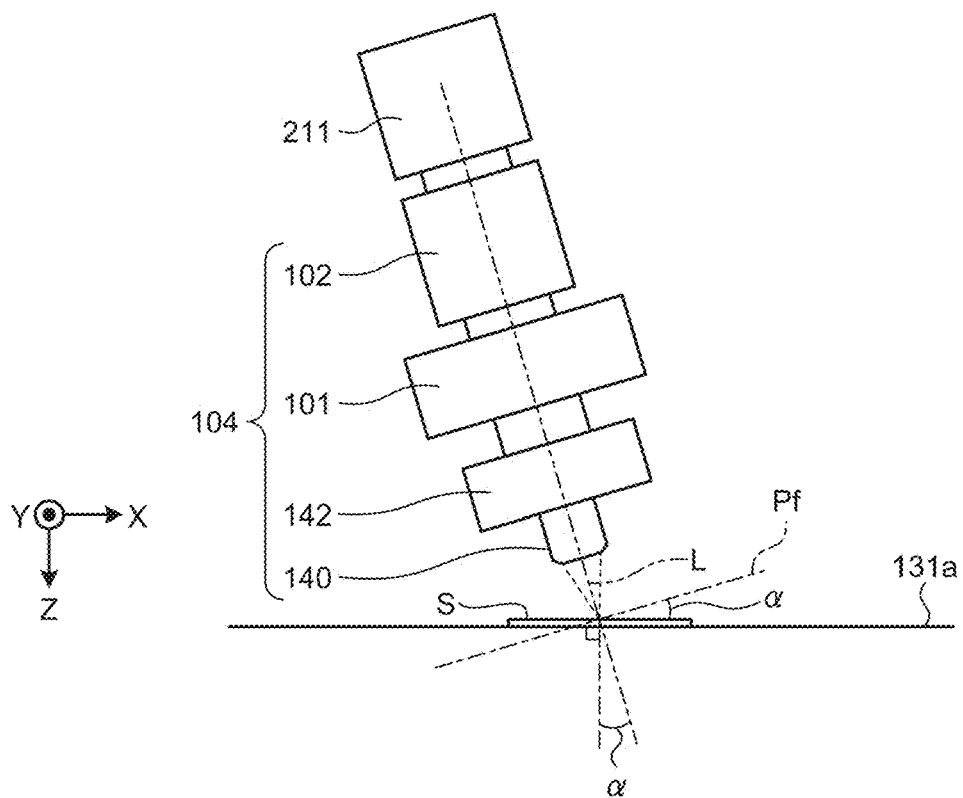
FIG. 12 is a schematic diagram for explanation of a method for acquisition of a multi-focused image according to a first modified example of the first embodiment.
Figure 13:
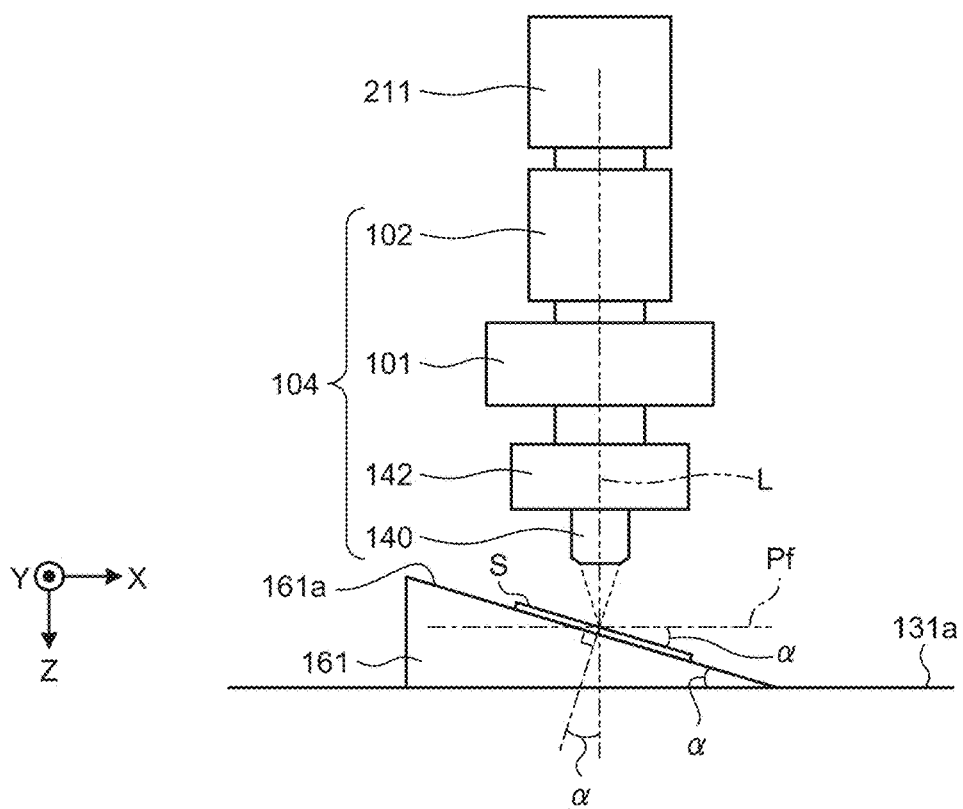
FIG. 13 is a schematic diagram for explanation of the method for acquisition of a multi-focused image according to the first modified example of the first embodiment.

Next, a first modified example of the first embodiment will be described. FIG. 12 and FIG. 13 are schematic diagrams for explanation of a method for acquisition of a multi-focused image according to the first modified example.

In the above described first embodiment, the optical axis of the observation optical system 104 is orthogonal to the stage 131, and when the multi-focused image $SI_i$ having the shift amount $\sigma_i$ is acquired, imaging is executed while the stage 131 is moved in the Z direction and X direction. However, imaging may be executed with the optical axis of the observation optical system 104 being made inclined with respect to the stage 131 beforehand.

For example, as illustrated in FIG. 12, the subject placement surface 131a of the stage 131 is installed horizontally, and the optical axis L of the observation optical system 104 is made inclined by an angle α, with respect to a normal line of this subject placement surface 131a. Thereby, a focal plane Pf of the imaging unit 211 is inclined by the angle α, with respect to the subject placement surface 131a. In this case, by the observation optical system 104 being moved along the optical axis L toward the subject placement surface 131a, the focal plane Pf moves in the +Z direction toward the subject S and the field of view shifts in the +X direction. That is, the control of two-dimensionally moving the observation optical system 104 becomes unnecessary, and driving control for the observation optical system 104 is able to be simplified.

Or, as illustrated in FIG. 13, the subject placement surface 131a of the stage 131 is installed horizontally, and the optical axis L of the observation optical system 104 is installed orthogonally to this subject placement surface 131a. A base 161 having an inclined plane at the angle α with respect to a bottom plane thereof is installed on the stage 131. By placement of the subject S on an inclined plane 161a of this base 161, the focal plane Pf of the imaging unit 211 is inclined with respect to the inclined plane 161a by the angle α. In this case, by the stage 131 being moved in the −Z direction, or the observation optical system 104 being moved in the +Z direction, the focal plane Pf moves in the +Z direction toward the subject S and the field of view shifts in the +X direction. In this case, the control of two-dimensionally moving the stage 131 or the observation optical system 104 becomes unnecessary, and driving control for the stage 131 or the observation optical system 104 is able to be simplified.

As described above, when the focal plane Pf is inclined with respect to the subject S, various imaging parameters are set as described below. When a shift amount between adjacent slices in the multi-focused image $SI_i$ is $\sigma_i$ (pixels), the pixel pitch of the imaging unit 211 is p (μm/pixel), the number of depths of field Δz included in a superimposed imaging range of the thickness D is N (N=D/Δz), and the observation magnification is M times; an angle $\alpha_i$ is given by the following Equation (3).

$$\alpha_i = \tan^{-1}\{(p \times \sigma_i \times N/M)/D\} \quad (3)$$

The shift amount acquisition processing unit 231 calculates and outputs the angle $\alpha_i$ based on the shift amount $\sigma_i$. Based on this angle $\alpha_i$, the imaging control unit 22 executes, as illustrated in FIG. 12, control of making the focal plane Pf of the observation optical system 104 inclined with respect to the subject placement surface 131a by the angle $\alpha_i$.

Or, if the base 161 is installed as illustrated in FIG. 13, a user inputs the angle α of the inclined plane 161a with respect to the subject placement surface 131a by using the input unit 25. In this case, the shift amount acquisition processing unit 231 calculates the shift amount σ corresponding to the angle α from Equation (3), and based on this shift amount σ, the imaging control unit 22 calculates various control parameters.

Second Modified Example of First Embodiment

Next, a second modified example of the first embodiment according to the present disclosure will be described. In the above described first embodiment, by the positions of the focal plane and the field of view V being continuously shifted with the shutter being released in one exposure period of the imaging unit 211, a multi-focused image is acquired. However, a shutter that blocks incidence of light on the imaging unit 211 may be opened and shut at a predetermined cycle, and the positions of the focal plane and the field of view V may be shifted stepwise while the shutter is shut.

The number of times the shutter is opened and closed in one exposure period, that is, the number of times the subject S is exposed to the imaging unit 211, or the number of times the positions of the focal plane and the field of view V are shifted, and the shift amounts of the positions of the focal plane and the field of view V per one time are set as appropriate according to the exposure period of one time in the imaging unit 211, the shutter speed, and the like.

For example, when the multi-focused image $SI_{11}$ having the shift amount of zero illustrated in FIG. 4A is acquired, the focal plane is moved, while the shutter is open, in a predetermined superimposed imaging range, specifically, by plural times the depth of field (k×Δz, where k is a natural number). Further, when the multi-focused image $SI_i$ illustrated in FIG. 4B and having the shift amount $\sigma_i$ is acquired, while the focal plane is moved during a period, in which the shutter is open, in a predetermined superimposed imaging range, specifically, by plural times the depth of field (k×Δz), the position of the field of view V is shifted by plural times (k×$\sigma_i$) the shift amount $\sigma_i$.

In this case, at Step S11 in FIG. 3, a PSF image corresponding to plural slices from opening to shutting of the shutter is generated. Further, at Step S171 in FIG. 5, correspondingly to the shift amount of the position of the field of view V according to the opening and shutting cycle of the shutter, the PSF image is shifted. Processing at Steps S12, S172, and S173 is the same as that of the above described first embodiment.

Third Modified Example of First Embodiment

Next, a third modified example of the first embodiment will be described. In the above described first embodiment, for promotion of understanding, the case where the field of view V of the observation optical system 104 is shifted only in the X direction has been described, but similar processing may be executed for the Y direction and X-Y direction. In this case, an all-focused image corresponding to a case, in which a virtual viewpoint with respect to the subject S is moved along the Y direction or X-Y direction, is generated. For the X-Y direction, all-focused images are generated respectively along two orthogonal directions. Further, by the field of view V of the observation optical system 104 being shifted in the four directions, which are the X direction, the Y direction, and the X-Y direction, an all-focused image corresponding to a case, in which a virtual viewpoint with respect to the subject S is moved in a horizontal plane, is also able to be generated.

Figure 14:
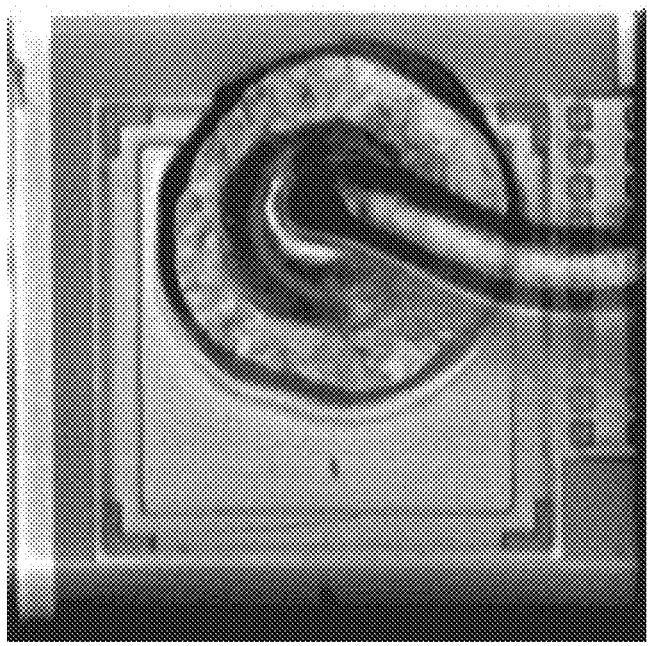
FIG. 14 is a diagram illustrating an example of an all-focused image to be displayed on the display device according to a third modified example of the first embodiment.
Figure 15:
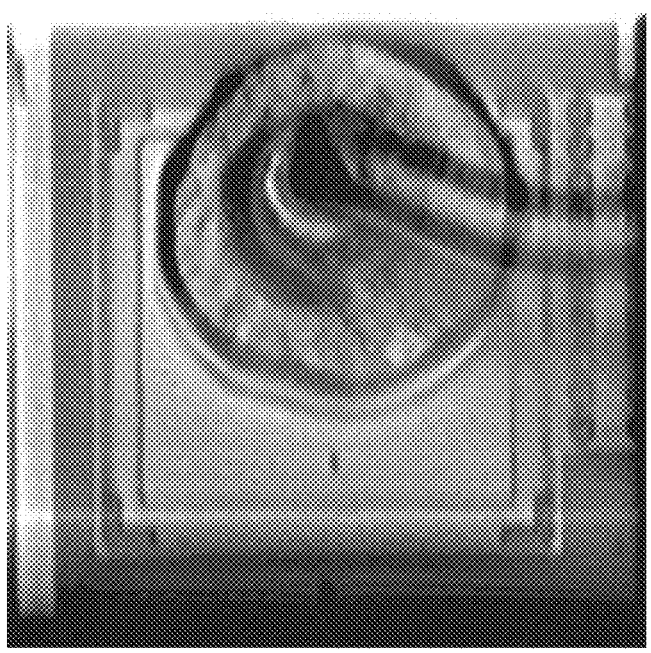
FIG. 15 is a diagram illustrating an example of an all-focused image to be displayed on the display device according to the third modified example of the first embodiment.
Figure 16:
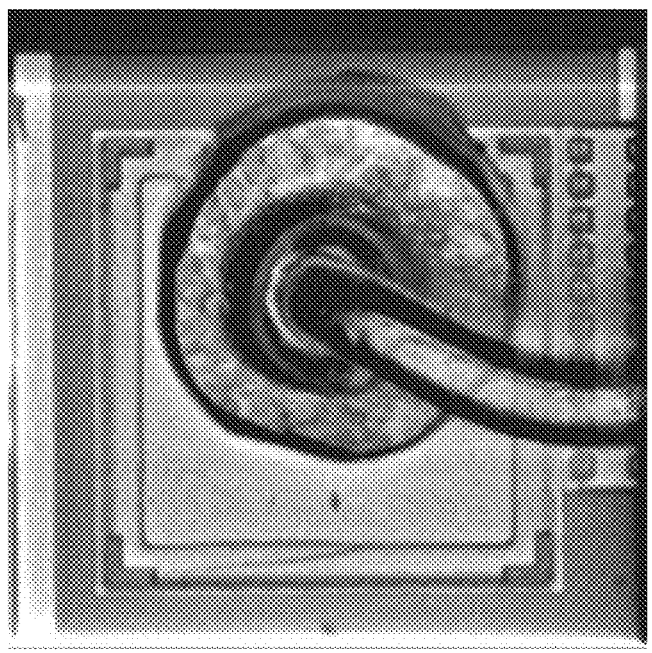
FIG. 16 is a diagram illustrating an example of an all-focused image to be displayed on the display device according to the third modified example of the first embodiment.
Figure 17:
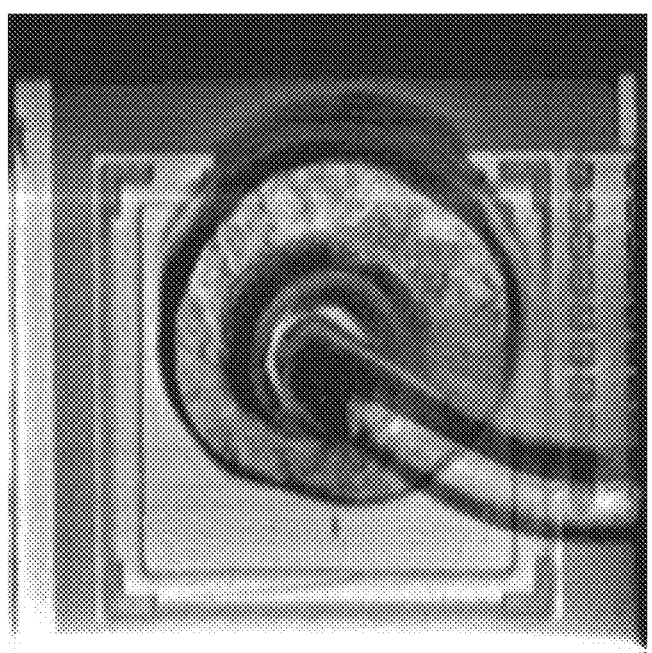
FIG. 17 is a diagram illustrating an example of an all-focused image to be displayed on the display device according to the third modified example of the first embodiment.

FIG. 14 to FIG. 25 are diagrams each illustrating an example of an all-focused image in a case where movement is executed along the Y direction or X-Y direction for the above described all-focused image $AI_0$ (=all-focused image $AI_{11}$) having the shift amount of zero. FIG. 14 is a diagram illustrating an example of an all-focused image to be displayed on the display device 30, and is a diagram illustrating an all-focused image $AI_{+21}$ when shifting is executed in the +Y direction by a shift amount $\sigma_{11}$ (>0). FIG. 15 is a diagram illustrating an example of an all-focused image to be displayed on the display device 30, and is a diagram illustrating an all-focused image $AI_{+22}$ when shifting is executed in the +Y direction by a shift amount $\sigma_{22}$ (>$\sigma_{21}$). FIG. 16 is a diagram illustrating an example of an all-focused image to be displayed on the display device 30, and is a diagram illustrating an all-focused image $AI_{-21}$ when shifting is executed in the −Y direction by the shift amount $\sigma_{21}$. FIG. 17 is a diagram illustrating an example of an all-focused image to be displayed on the display device 30, and is a diagram illustrating an all-focused image $AI_{-22}$ when shifting is executed in the −Y direction by the shift amount $\sigma_{22}$.

Figure 18:
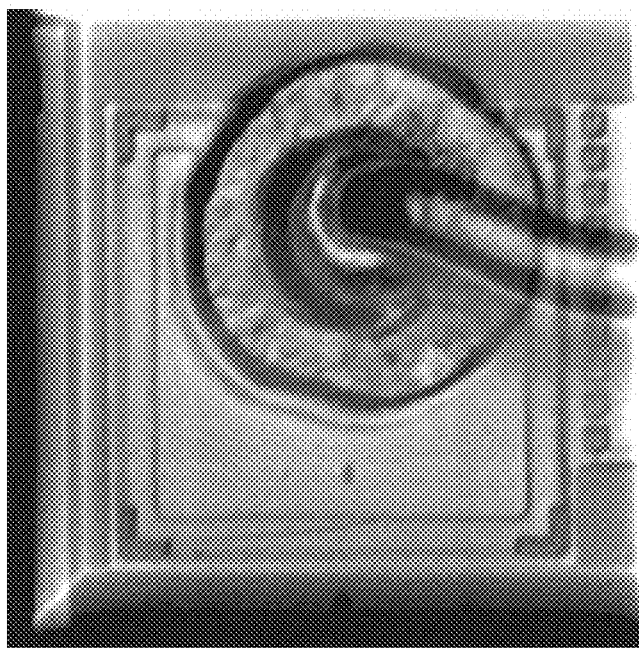
FIG. 18 is a diagram illustrating an example of an all-focused image to be displayed on the display device according to the third modified example of the first embodiment.
Figure 19:
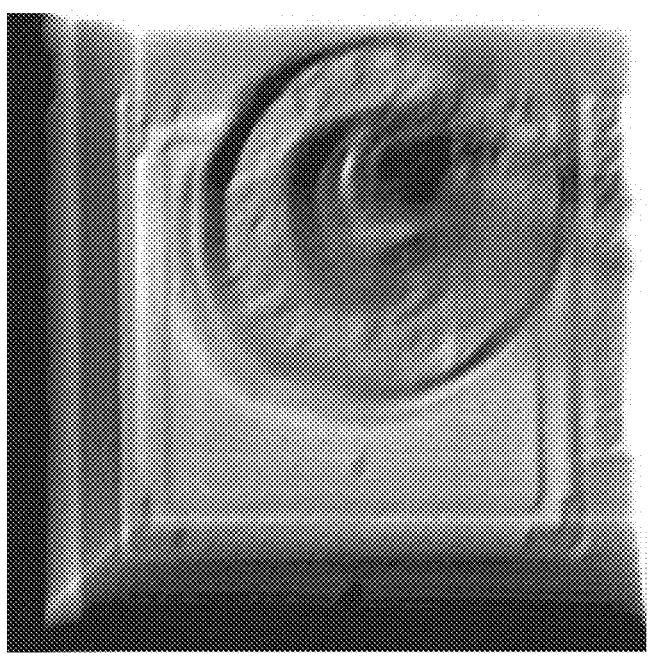
FIG. 19 is a diagram illustrating an example of an all-focused image to be displayed on the display device according to the third modified example of the first embodiment.
Figure 20:
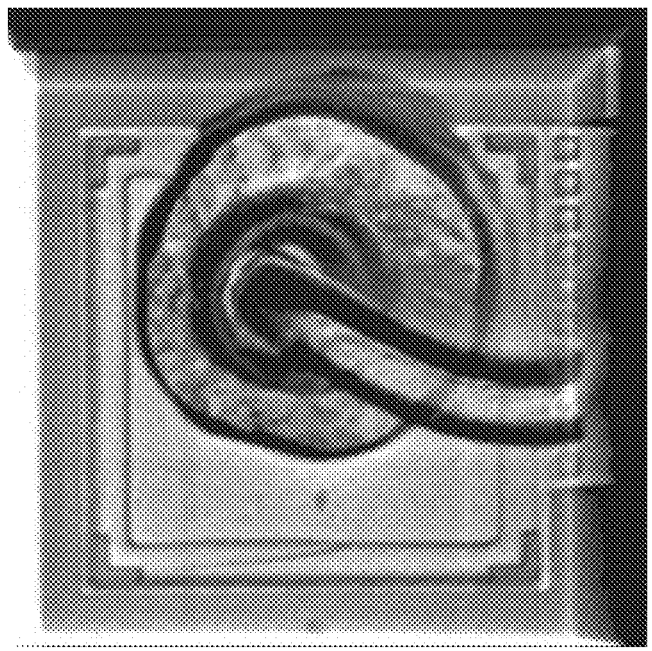
FIG. 20 is a diagram illustrating an example of an all-focused image to be displayed on the display device according to the third modified example of the first embodiment.
Figure 21:
FIG. 21 is a diagram illustrating an example of an all-focused image to be displayed on the display device according to the third modified example of the first embodiment.

Further, FIG. 18 is a diagram illustrating an example of an all-focused image to be displayed on the display device 30, and is a diagram illustrating an all-focused image $AI_{+31}$ when shifting is executed in the +X direction and +Y direction by a shift amount $\sigma_{31}$ (>0). FIG. 19 is a diagram illustrating an example of an all-focused image to be displayed on the display device 30, and is a diagram illustrating an all-focused image $AI_{+32}$ when shifting is executed in the +X direction and +Y direction by a shift amount $\sigma_{32}$ (>$\sigma_{31}$). FIG. 20 is a diagram illustrating an example of an all-focused image to be displayed on the display device 30, and is a diagram illustrating an all-focused image $AI_{-31}$ when shifting is executed in the −X direction and −Y direction by the shift amount $\sigma_{31}$. FIG. 21 is a diagram illustrating an example of an all-focused image to be displayed on the display device 30, and is a diagram illustrating an all-focused image $AI_{-32}$ when shifting is executed in the −X direction and −Y direction by the shift amount $\sigma_{32}$.

Figure 22:
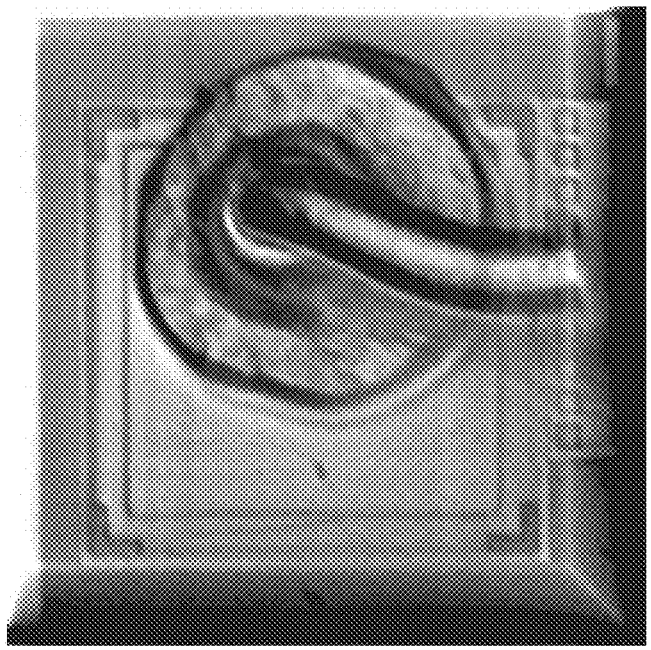
FIG. 22 is a diagram illustrating an example of an all-focused image to be displayed on the display device according to the third modified example of the first embodiment.
Figure 23:
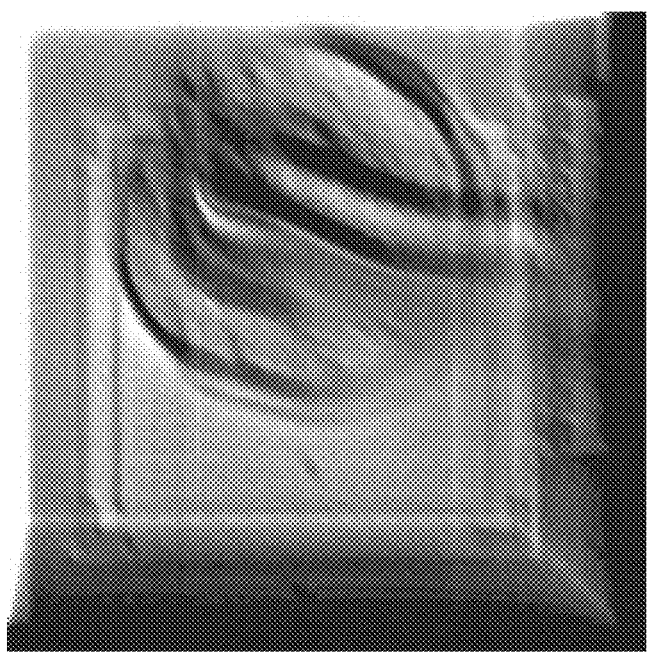
FIG. 23 is a diagram illustrating an example of an all-focused image to be displayed on the display device according to the third modified example of the first embodiment.
Figure 24:
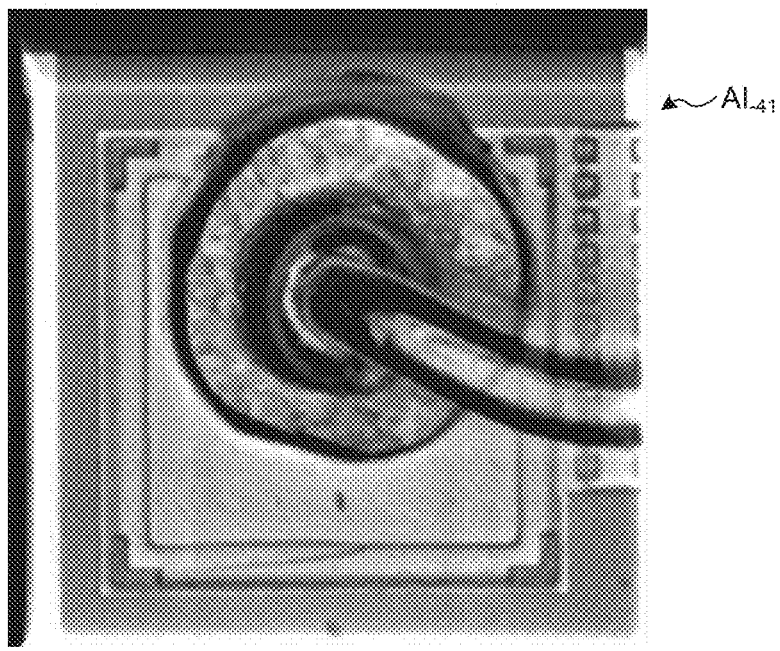
FIG. 24 is a diagram illustrating an example of an all-focused image to be displayed on the display device according to the third modified example of the first embodiment.
Figure 25:
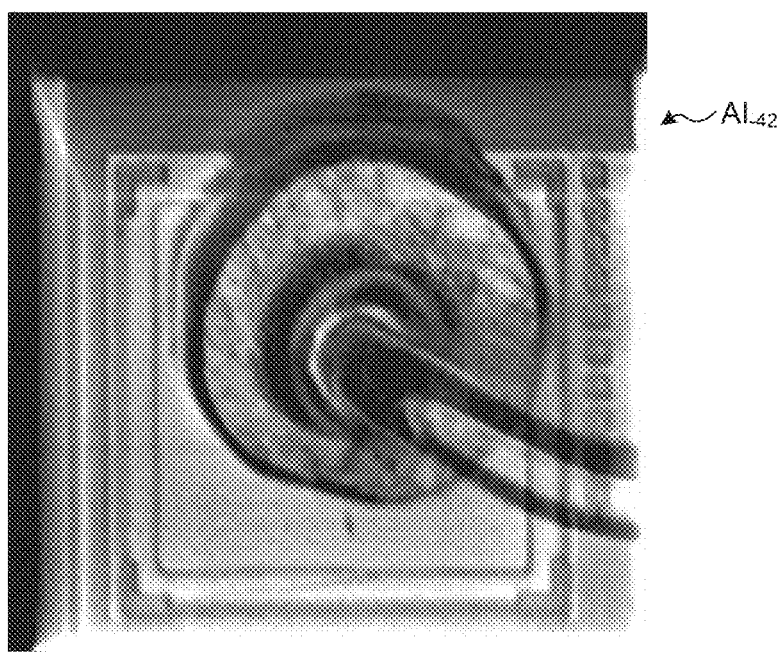
FIG. 25 is a diagram illustrating an example of an all-focused image to be displayed on the display device according to the third modified example of the first embodiment.

Further, FIG. 22 is a diagram illustrating an example of an all-focused image to be displayed on the display device 30, and is a diagram illustrating an all-focused image $AI_{+41}$ when shifting is executed in the −X direction and +Y direction by a shift amount $\sigma_{41}$ (>0). FIG. 23 is a diagram illustrating an example of an all-focused image to be displayed on the display device 30, and is a diagram illustrating an all-focused image $AI_{+42}$ when shifting is executed in the −X direction and +Y direction by a shift amount $\sigma_{42}$ (>$\sigma_{41}$). FIG. 24 is a diagram illustrating an example of an all-focused image to be displayed on the display device 30, and is a diagram illustrating an all-focused image $AI_{-41}$ when shifting is executed in the +X direction and −Y direction by the shift amount $\sigma_{41}$. FIG. 25 is a diagram illustrating an example of an all-focused image to be displayed on the display device 30, and is a diagram illustrating an all-focused image $AI_{-42}$ when shifting is executed in the +X direction and −Y direction by the shift amount $\sigma_{42}$. The shift amounts $\sigma_{21}$, $\sigma_{22}$, $\sigma_{31}$, $\sigma_{32}$, $\sigma_{41}$, and $\sigma_{42}$ may be the same, or may be different from one another, or a combination of the same ones and different ones. The above described all-focused images are just a part excerpted from all-focused images, and plural all-focused images actually exist between the respective images and are consecutively displayed.

The display device 30 sequentially (consecutively) displays, in the same display area, in addition to the plural all-focused images $AI_0$, $AI_{+1}$, $AI_{+2}$, $AI_{-1}$, and $AI_{-2}$ generated, the all-focused images $AI_{+21}$, $AI_{+22}$, $AI_{-21}$, $AI_{-22}$, $AI_{+31}$, $AI_{+32}$, $AI_{-31}$, $AI_{-32}$, $AI_{+41}$, $AI_{+42}$, $AI_{-41}$, and $AI_{-42}$, in chronological order. The shift in the X-Y direction is able to be realized by movement or rotation of the lens barrel 102 and the stage 131.

As described above, in this third modified example, since the magnitude of the shift amount $\sigma_i$ is changed among the plural multi-focused images $SI_i$, the state where the subject S is virtually observed from plural directions of a wider range is able to be reproduced and displayed as all-focused images consecutively on the display device 30. Therefore, a user is able to grasp the Z direction position of a structure in the subject S, how the structures overlap one another, and the front and back relations among the structures, intuitively and more realistically.

Fourth Modified Example of First Embodiment

Figure 26:
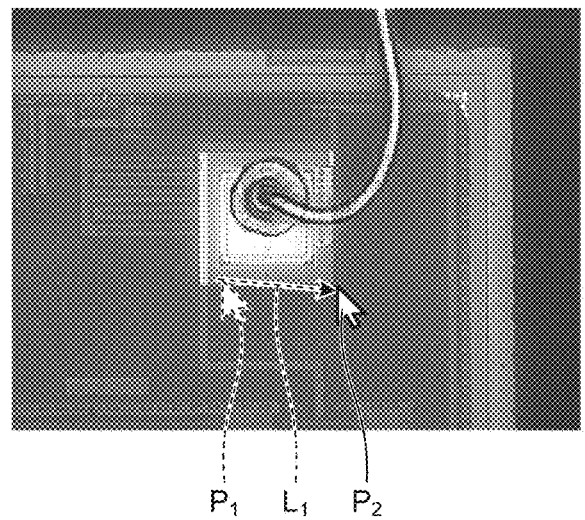
FIG. 26 is a schematic diagram for explanation of a method for acquisition of a multi-focused image according to a fourth modified example of the first embodiment.
Figure 27:
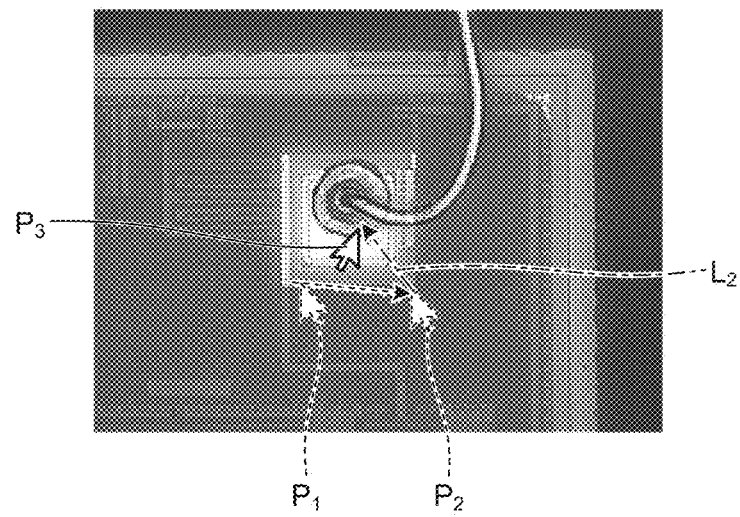
FIG. 27 is a schematic diagram for explanation of the method for acquisition of a multi-focused image according to the fourth modified example of the first embodiment.

Next, a fourth modified example of the first embodiment will be described. In the above described first embodiment, the case where the field of view V of the observation optical system 104 is shifted in a predetermined direction has been described, but a direction of the shift may be specified by a user. FIG. 26 and FIG. 27 are schematic diagrams for explanation of a method for acquisition of a multi-focused image according to the fourth modified example of the first embodiment.

In this fourth modified example, based on a direction specified by a user from an arbitrary all-focused image, all-focused images in plural viewpoint directions are displayed consecutively. As a method for the specification of a direction, any means may be used, such as mouse movement, a line of sight, movement of a finger touching a screen, or a spatial user operation (for example, with a finger, a hand, or the like), as long as a desired direction of movement is able to be identified.

When setting of a selection of an all-focused image to be displayed is input by a user, an arbitrary all-focused image (for example, an all-focused image having a shift amount of zero) is displayed, under control by the control unit 23. By operating a mouse or the like, the user moves a pointer in a direction in which shifting is desired to be executed, via the input unit 25. Specifically, if a direction is determined from the movement of the pointer, movement vectors Vx and Vy are acquired from a locus $L_1$ of movement of a pointer $P_1$ to a position of a pointer $P_2$ on the screen through operation on the mouse, and are determined as a shift direction of the position of the X-Y plane. For the actually measured Vx and Vy (pixels), from a ratio between these Vx and Vy, a direction component (inclination component) is calculated, the direction of this component is determined as the shift direction, and an all-focused image is generated and displayed, from β multi-focused images captured as a result of imaging with the number of times of shifting being β times at the predetermined shift amount $\sigma_i$, similarly to the first embodiment.

Further, if the pointer $P_2$ on the screen has moved to a position of a pointer $P_3$ by operation on the mouse or the like, the movement vectors Vx and Vy are acquired from a locus $L_2$ of the moved pointer, and are determined as a shift direction of the position of the X-Y plane.

Further, although display of an all-focused image based only on a movement direction of a pointer has been described, not being limited thereto, for example, the number of times of shifting β may be determined from the movement amounts of Vx and Vy and the predetermined shift amount $\sigma_i$.

According to this fourth modified example, by display of an all-focused image for a shift direction according to a user's operation, intuitive observation is able to be realized as if the user is moving the observed subject.

Second Embodiment

Figure 28:
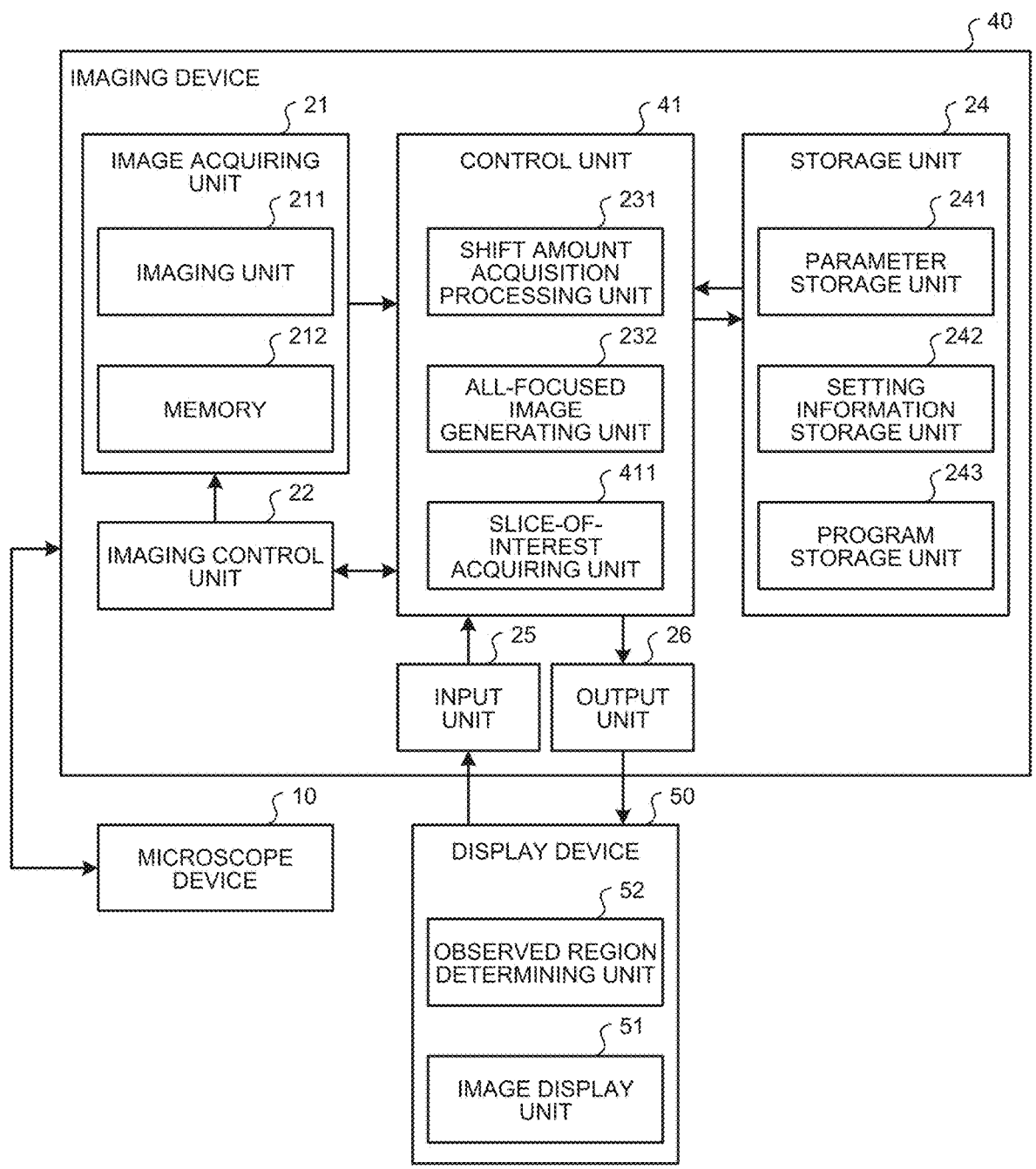
FIG. 28 is a block diagram illustrating an example of a configuration of a microscopy system according to a second embodiment.

Next, a second embodiment will be described. FIG. 28 is a block diagram illustrating an example of a configuration of a microscopy system according to the second embodiment. As illustrated in FIG. 28, a microscopy system 2 according to the second embodiment includes: the microscope device 10; an imaging device 40 that acquires and processes an image of a subject image generated by the microscope device 10; and a display device 50 that displays the image or the like processed by the imaging device 40. Among these, the configuration and operation of the microscope device 10 are the same as those of the first embodiment (see FIG. 2).

The imaging device 40 includes a control unit 41, instead of the control unit 23 illustrated in FIG. 1. The control unit 41 further includes a slice-of-interest acquiring unit 411, in contrast to the control unit 23. The configurations and operation of the shift amount acquisition processing unit 231 and the all-focused image generating unit 232 are the same as those of the first embodiment.

The slice-of-interest acquiring unit 411 acquires a position of a slice in the Z direction, the slice including a structure in the subject S corresponding to an observed region input via the input unit 25 from the display device 50 described later, and determines this slice as a slice of interest.

The display device 50 is formed of, for example, an LCD, an EL display, or a CRT display, and includes: an image display unit 51 that displays thereon an image and related information output from the output unit 26; and an observed region determining unit 52 that determines, according to operation performed from outside, a region in an all-focused image displayed on the image display unit 51 as an observed region, and inputs a signal representing the observed region to the control unit 41.

Figure 29:
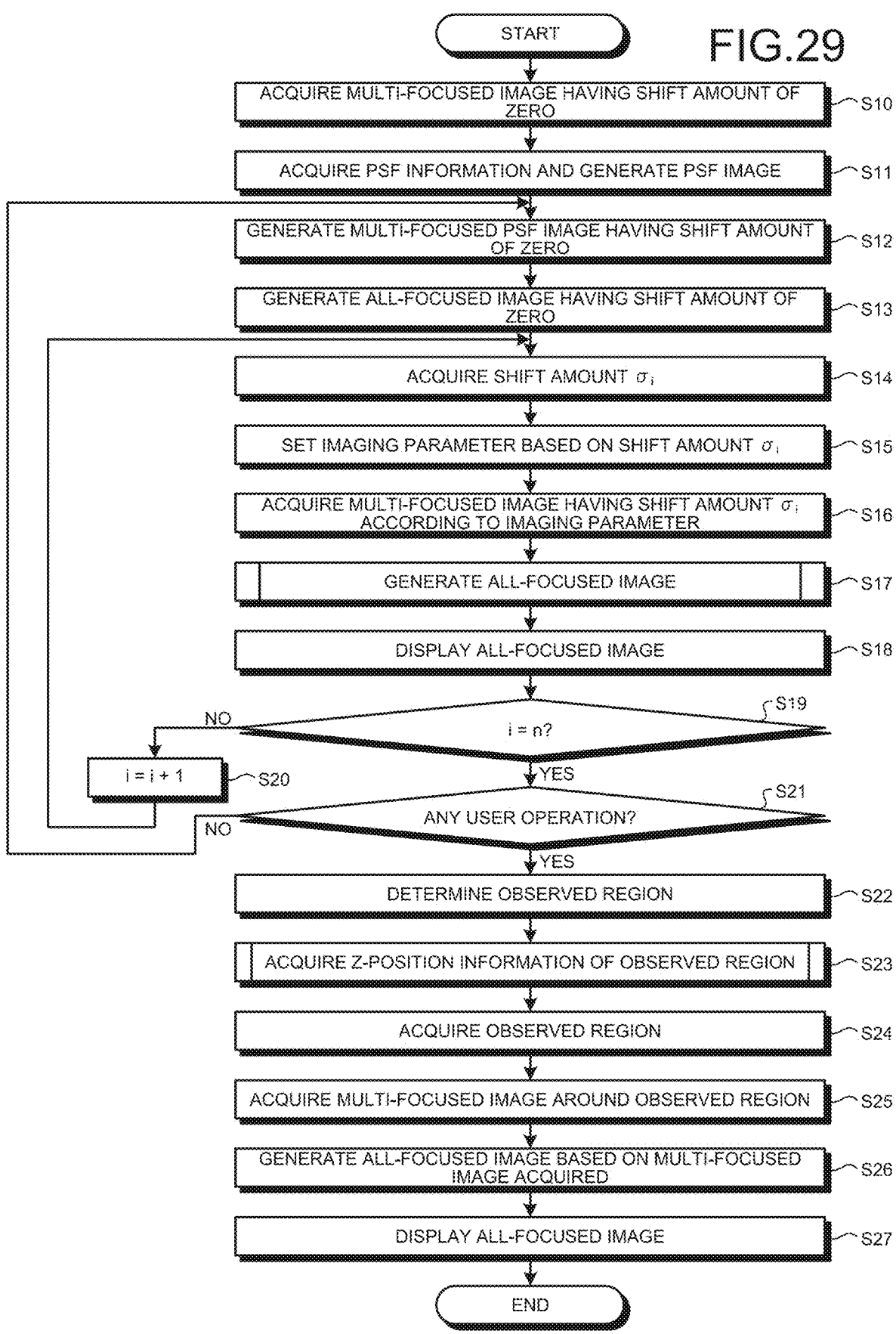
FIG. 29 is a flow chart illustrating operation of the microscopy system illustrated in FIG. 28.

Next, operation of the microscopy system 2 will be described. FIG. 29 is a flow chart illustrating the operation of the microscopy system 2. Operation at Steps S10 to S20 is the same as that of the first embodiment. Further, FIG. 30A to FIG. 30D are schematic diagrams illustrating plural multi-focused images $SI_i$ (i=51 to 54) generated at Step S10. In the second embodiment, by these multi-focused images $SI_i$ being reconstructed, plural all-focused images $AI_i$ are respectively generated, and are displayed on the image display unit 51 by being switched sequentially.

If the variable i has reached the maximum value n at Step S19 (Step S19: Yes), the observed region determining unit 52 determines whether or not a user operation for selection of an arbitrary observed region has been performed on any of all-focused images $AI_{51}$, $AI_{52}$, $AI_{53}$, and $AI_{54}$ displayed on the image display unit 51 (Step S21).

If the user operation has not been performed (Step S21: No), the operation of the microscopy system 2 returns to Step S12.

Figure 31:
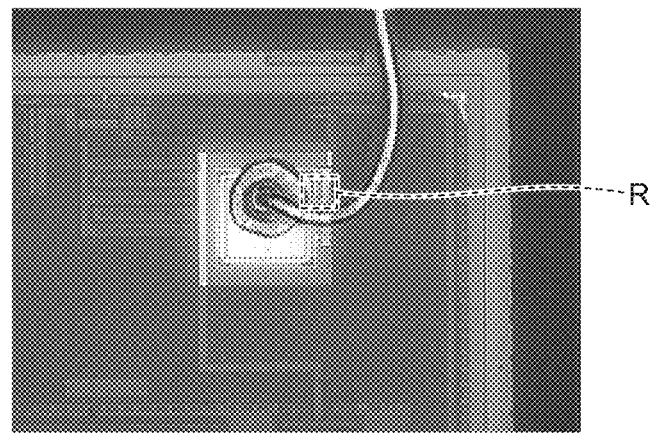
FIG. 31 is a schematic diagram illustrating an example of a method for selection of an observed region.

On the contrary, if the user operation has been performed (Step S21: Yes), the observed region determining unit 52 determines the region selected by the user operation as an observed region, and inputs a signal representing the observed region, to the control unit 41 (Step S22). FIG. 31 is a schematic diagram illustrating an example of a method for selection of an observed region. The selection of an observed region is performed by, for example, as illustrated in FIG. 26, a desired observed region R in an all-focused image displayed on the image display unit 51 being specified by a pointer operation by use of a mouse or the like.

A region desired to be selected may not be able to be checked from an all-focused image having a shift amount of zero, for example. In this case, the region desired to be selected by a user may be enabled to be checked by change of the display to an all-focused image acquired by shifting. In that case, all-focused images acquired as a result of shifting in respective directions are assumed to be stored already in the storage unit 24.

Figure 32:
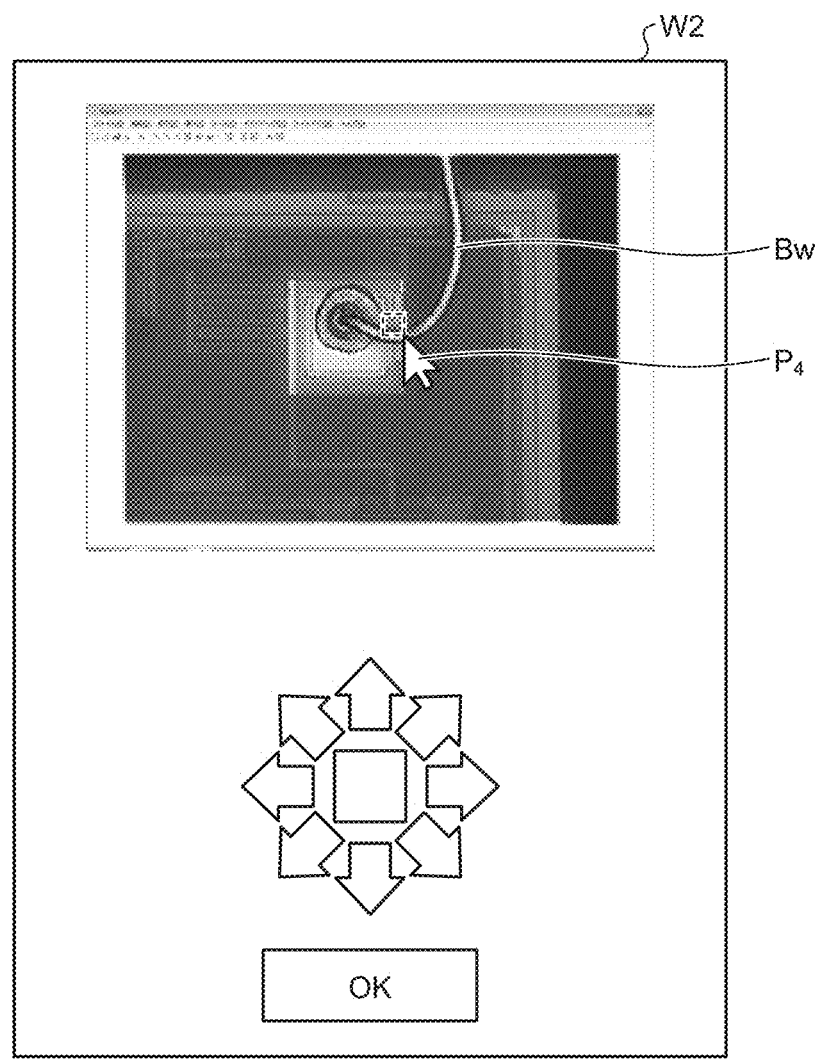
FIG. 32 is a schematic diagram for explanation of a setting screen for observed region specification processing on an all-focused image.
Figure 33:
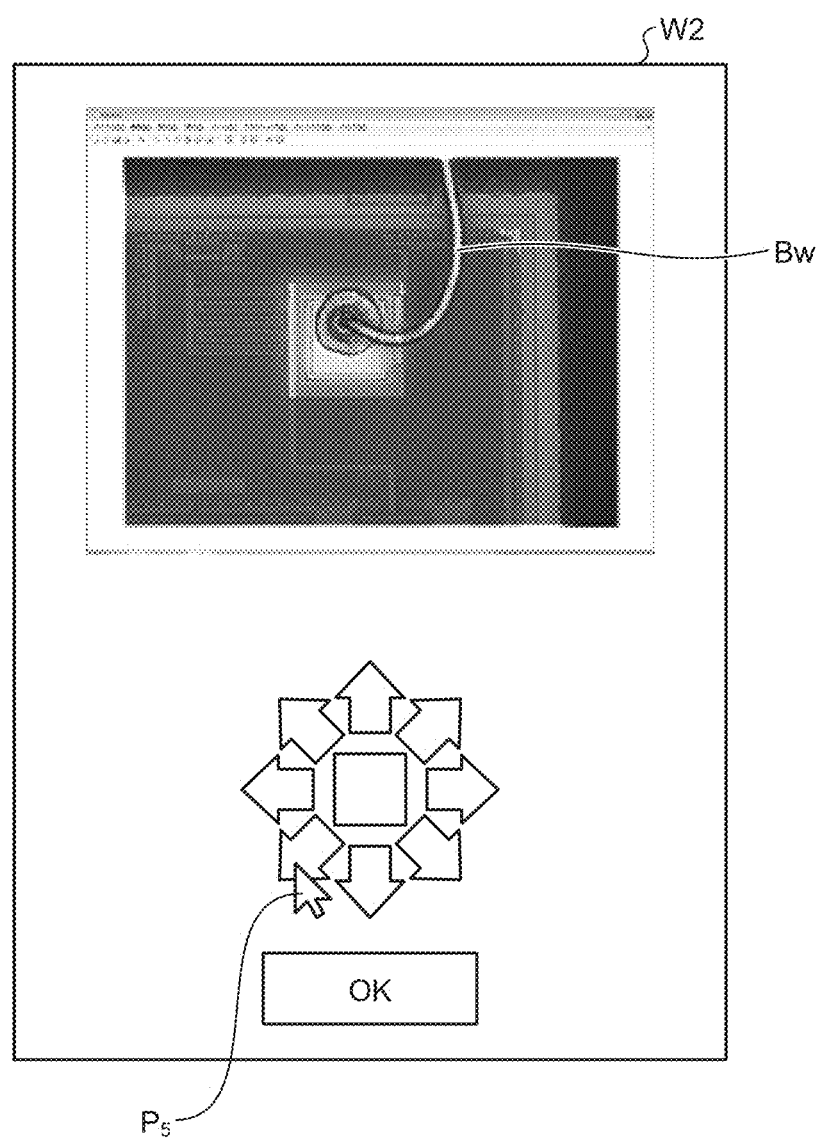
FIG. 33 is a schematic diagram for explanation of the setting screen for the observed region specification processing on the all-focused image.
Figure 34:
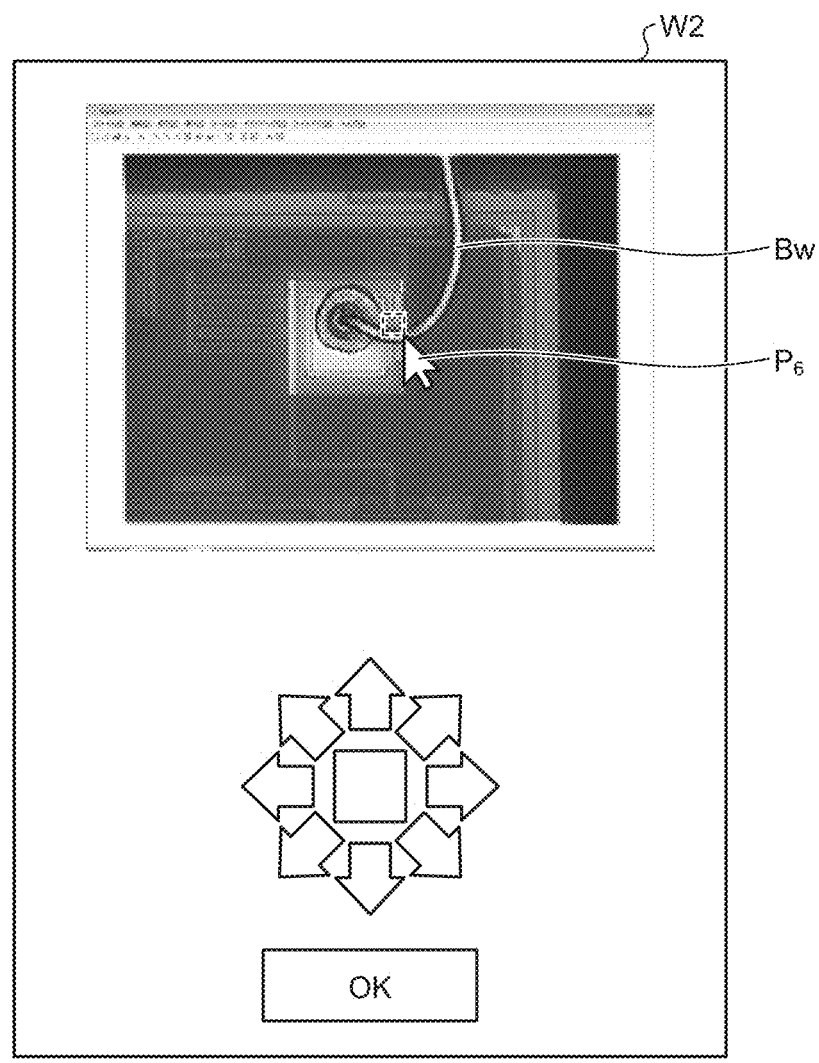
FIG. 34 is a schematic diagram for explanation of the setting screen for the observed region specification processing on the all-focused image.

FIG. 32 to FIG. 34 are schematic diagrams for explanation of a setting screen for observed region specification processing on an all-focused image. On a setting screen W2 illustrated in FIG. 32, an all-focused image having a shift amount of zero is displayed, for example. If a region below a wire Bw in this all-focused image is desired to be selected as an observed region, in the all-focused image having the shift amount of zero, even if a pointer $P_4$ is placed, a user is unable to select the observed region with the wire Bw being in the way. Thus, the user moves the pointer $P_4$ by operating a mouse or the like to arrows representing shift directions (block arrows in FIG. 32 to FIG. 34), as illustrated in FIG. 33, and selects an arrow of a direction in which shifting is desired to be performed. If a rightward direction in FIG. 32 to FIG. 34 is the +X direction, and an upward direction therein is the +Y direction, for example, as illustrated in FIG. 33, with a pointer $P_5$, an arrow representing the −X direction and −Y direction is able to be selected.

In a state where the arrow representing the −X direction and −Y direction has been selected by the pointer $P_5$, when the selection of that arrow is input by clicking of the mouse or the like, the all-focused image having the shift amount of zero is able to be switched to an all-focused image acquired as a result of shifting by a predetermined amount in that direction. When the all-focused image, on which the observed region desired to be selected is able to be checked, is displayed by shifting of the all-focused image, as illustrated in FIG. 34, the observed region R is selected by a pointer $P_6$.

Figure 35:
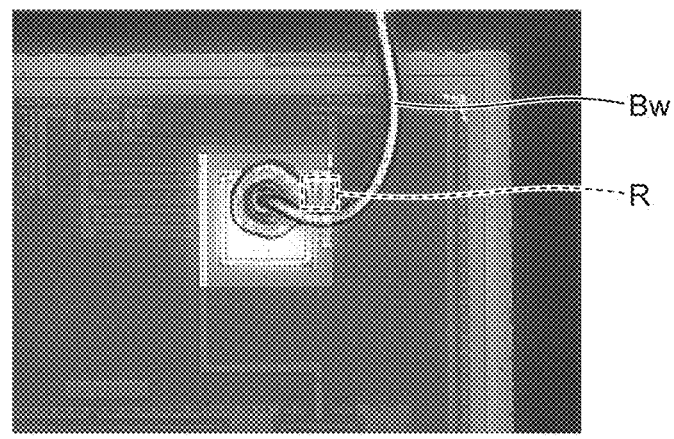
FIG. 35 is a schematic diagram for explanation of a method for acquisition of a multi-focused image according to the second embodiment.

FIG. 35 is a schematic diagram for explanation of a method for acquisition of a multi-focused image according to the second embodiment, and is a diagram illustrating an all-focused image displayed after the above described shifting processing. In the all-focused image, which is illustrated in FIG. 35 and has been subjected to the shifting processing, the wire Bw is displaced from that in the all-focused image illustrated in FIG. 31, and the user is able to select and specify the observed region R desired to be selected, from this all-focused image.

Figure 36:
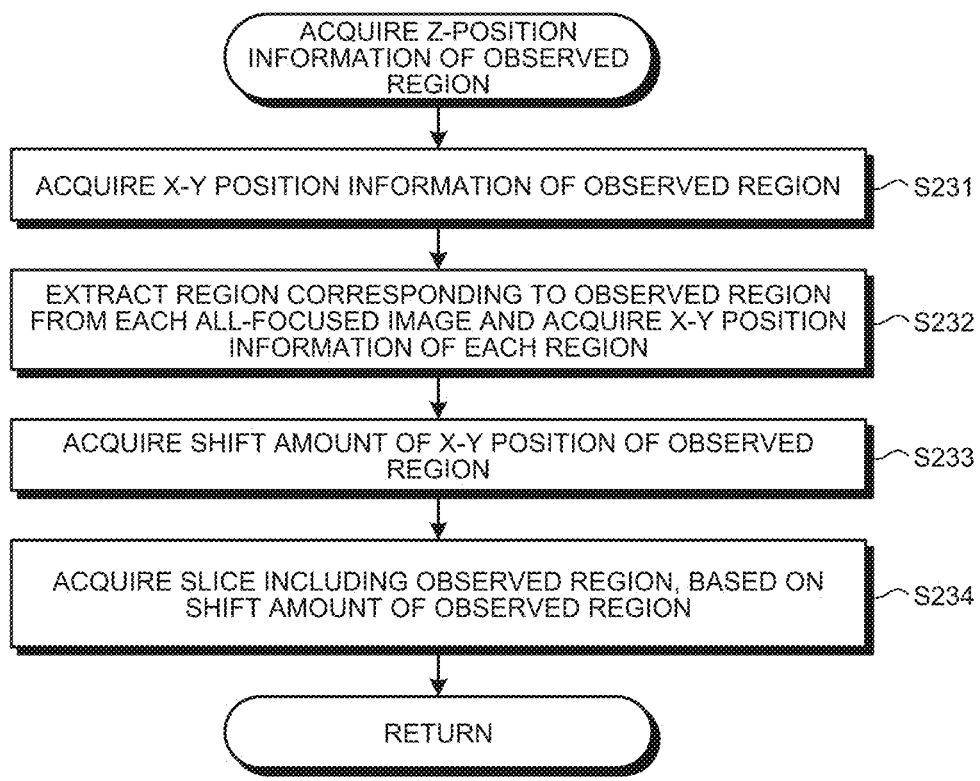
FIG. 36 is a flow chart illustrating details of processing for acquisition of Z-position information of an observed region.

At subsequent Step S23, the control unit 41 acquires, based on information representing the observed region input from the observed region determining unit 52, Z-position information of the observed region. FIG. 36 is a flow chart illustrating details of processing for acquisition of the Z-position information of the observed region. Hereinafter, as an example, a region $R_{54}$ in the all-focused image $AI_{54}$ illustrated in FIG. 30D is assumed to have been determined as an observed region.

At Step S231, the slice-of-interest acquiring unit 411 acquires X-Y position information of the observed region $R_{54}$ in the all-focused image $AI_{54}$.

At subsequent Step S232, the slice-of-interest acquiring unit 411 extracts regions $R'_{51}$, $R'_{52}$, and $R'_{53}$ corresponding to the observed region $R_{54}$, respectively from the all-focused images $AI_{51}$, $AI_{52}$, and $AI_{53}$ other than the all-focused image $AI_{54}$, and acquires X-Y position information of each of these regions. The regions $R'_{51}$, $R'_{52}$, and $R'_{53}$ may be extracted by use of a publicly known image recognition technique, such as similarity computation by pattern matching or by use of the sum of absolute difference (SAD). Hereinafter, these areas $R'_{51}$, $R'_{52}$, and $R'_{53}$ may also be referred to as observed regions.

At subsequent Step S233, the slice-of-interest acquiring unit 411 acquires shift amounts of the X-Y positions of the observed regions $R'_{51}$, $R'_{52}$, $R'_{53}$, and $R_{54}$ among the all-focused images $AI_{51}$, $AI_{52}$, $AI_{53}$, $AI_{54}$. In the case of FIG. 30A to FIG. 30D, a shift amount between an X position of the observed region $R'_{51}$ in the all-focused image $AI_{51}$ and a position of the observed region $R'_{52}$ in the all-focused image $AI_{52}$, a shift amount between an X position of the observed region $R'_{52}$ in the all-focused image $AI_{52}$ and a position of the observed region $R'_{53}$ in the all-focused image $AI_{53}$, and a shift amount between an X position of the observed region $R'_{53}$ in the all-focused image $AI_{53}$ and a position of the observed region $R_{54}$ in the all-focused image $AI_{54}$ are acquired.

At subsequent Step S234, the slice-of-interest acquiring unit 411 acquires the slice $F_j$ including the observed regions $R'_{51}$, $R'_{52}$, $R'_{53}$, and $R_{54}$, based on the shift amounts of the observed regions $R'_{51}$, $R'_{52}$, $R'_{53}$, and $R_{54}$.

When a shift amount in an all-focused image $AI_i$ is $\sigma_i$, a shift amount $s_{i,j}$ of a position of the field of view V in each slice $F_j$ from a position of the field of view V in the slice $F_0$ of the uppermost plane is given by the following Equation (4).

$$s_{i,j} = \sigma_i \times j \quad (4)$$

Therefore, if a shift amount $|s_{(i+1),j} - s_{i,j}|$ among the observed regions $R'_{51}$, $R'_{52}$, $R'_{53}$, and $R_{54}$ is given, from the following Equation (5), the slice $F_j$ including the observed regions $R'_{51}$, $R'_{52}$, $R'_{53}$, and $R_{54}$ is able to be identified.

$$|s_{(i+1),j} - s_{i,j}| = \sigma_{i+1} \times j - \sigma_i \times j$$

$$j = |s_{(i+1),j} - s_{i,j}| / (\sigma_{i+1} - \sigma_i) \quad (5)$$

Figure 30A:
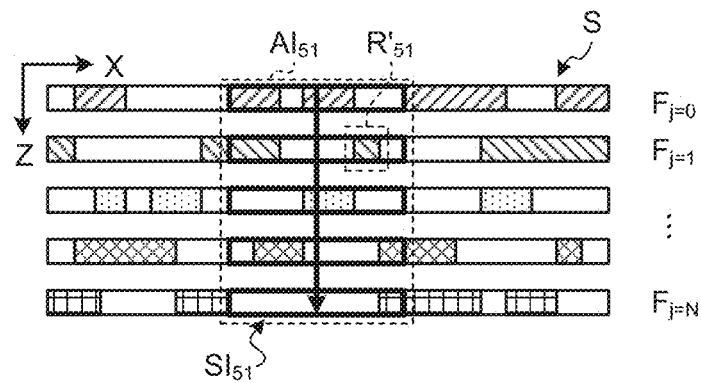
FIG. 30A to FIG. 30D are schematic diagrams illustrating plural multi-focused images.
Figure 30B:
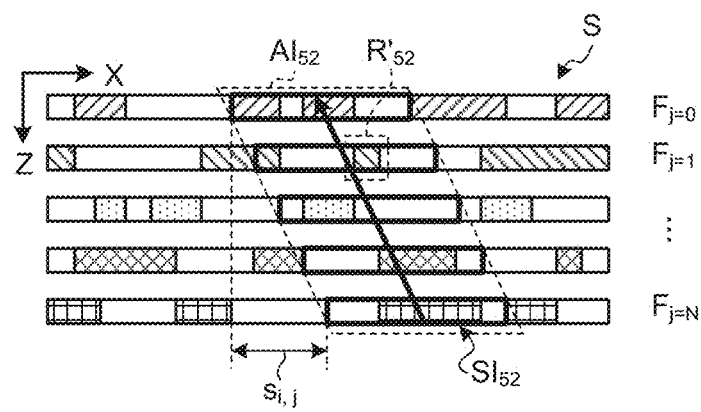
Figure 30C:
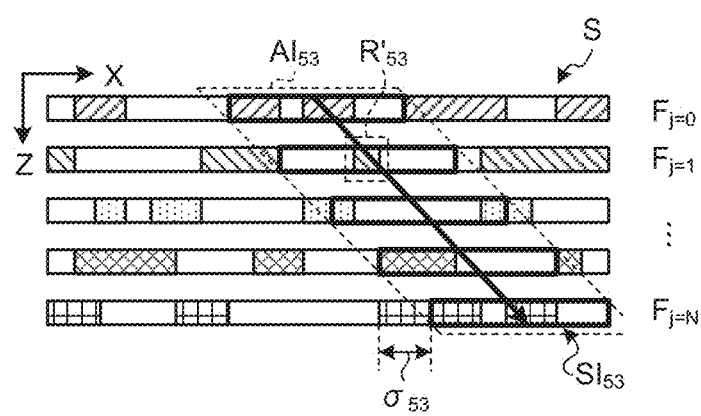
Figure 30D:
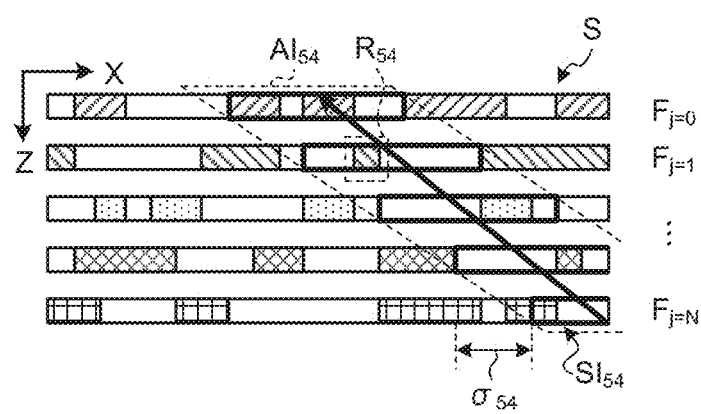

For example, as illustrated in FIG. 30C and FIG. 30D, if a shift amount $\sigma_{53}$ in the all-focused image $AI_{53}$ is two pixels, a shift amount $\sigma_{54}$ in the all-focused image $AI_{54}$ is three pixels, and a shift amount between the observed regions $R'_{53}$ and $R_{54}$ is two pixels; from Equation (5), j=2. That is, the observed region $R_{54}$ is found to be included in a slice $F_2$.

The slice-of-interest acquiring unit 411 outputs the slice $F_j$ acquired as described above, as Z position information of the observed region. Thereafter, the operation of the control unit 41 returns to the main routine.

At Step S24 subsequent to Step S23, the control unit 41 acquires the observed region $R_{54}$, based on the Z position information output by the slice-of-interest acquiring unit 411.

At subsequent Step S25, the imaging control unit 22 acquires a multi-focused image centering around the observed region $R_{54}$. This multi-focused image is a multi-focused image resulting from shifting in at least one of the above described X direction, Y direction, and X-Y direction.

At subsequent Step S26, the all-focused image generating unit 232 generates an all-focused image, based on the acquired multi-focused image.

At subsequent Step S27, the control unit 41 causes the all-focused image generated, to be displayed on the image display unit 51 of the display device 50. Thereafter, the operation of the microscopy system 2 is ended.

According to the above described second embodiment, a user is able to intuitively and easily grasp the Z direction positions of structures that are seen to be overlapping on a plane, and front and back relations among the structures.

Modified Example of Second Embodiment

Next, a modified example of the second embodiment will be described. In the above described second embodiment, imaging is performed around the acquired observed region, without the superimposed imaging range being changed, but the superimposed imaging range may be changed around the observed region.

FIG. 37A and FIG. 37B are schematic diagrams for explanation of processing for acquisition of multi-focused images according to the modified example of the second embodiment. For example, as illustrated in FIG. 37A, in a case where an all-focused image has been generated by acquisition of a multi-focused image in a superimposed imaging range $D_1$, if an observed region $R_{55}$ is selected, and an observed region is identified as described above, as illustrated in FIG. 37B, an all-focused image is generated by acquisition of a multi-focused image through imaging in a superimposed imaging range $D_2$ ($<D_1$).

The superimposed imaging range $D_2$ is, for example, by use of a depth of field (DOF) based on an observation magnification, a range of 5DOFs toward both a shallower side and a deeper side in a depth direction around a slice $F_n$ including the observed region $R_{55}$. Thereby, a multi-focused image having the slice $F_n$ including the observed region $R_{55}$, and slices $F_{n-1}$, $F_{n-2}$, $F_{n+1}$, and $F_{n+}$ at the shallower side and the deeper side in the depth direction is acquired.

According to this modified example, since an all-focused image limited to slices including and around the observed region in the depth direction is generated by the imaging range being limited, an all-focused image that is easy for a user to observe an observed region is able to be generated and displayed.

Third Embodiment

Next, a third embodiment will be described. FIG. 38 is a schematic diagram for explanation of a setting screen for image acquisition in processing for acquisition of a multi-focused image according to a third embodiment. In the above described second embodiment, observation quantity is checked by shifting of one observed region, but in this third embodiment, for structures overlapping in the depth direction (Z direction) to be checked, all-focused images shifted in another direction are displayed consecutively.

Specifically, as illustrated in FIG. 38, when two observed regions (observed regions $R_1$ and $R_2$) are selected in an all-focused image, similarly to the above described processing at Step S23 of the second embodiment, pieces of Z position information are respectively acquired for the observed regions $R_1$ and $R_2$. Thereafter, a central position of the acquired two pieces of Z position information is set as a shift center, and all-focused images that are shifted in: at least one of the X direction, Y direction, and X-Y direction; a preset direction; or a direction specified by a user, are consecutively displayed.

According to the above described third embodiment, when two observed regions are selected, all-focused images are consecutively displayed, the all-focused images having been shifted in a predetermined direction with a middle position of pieces of Z position information acquired from the two observed regions being the center of rotation, and thus, by the two observed regions being displayed as if the two observed regions exist at different positions, a user is able to easily grasp the two observed regions.

The present disclosure is not limited to the above described first to third embodiments and modified examples, as-is; and by combination of plural components disclosed in the respective embodiments and modified examples as appropriate, variations may be formed. For example, some components may be excluded from all of the components disclosed in the embodiments for the formation. Or, components disclosed in different ones of the embodiments may be combined as appropriate for the formation.

As described above, the present disclosure may include various embodiments and the like not described herein, and design changes and the like may be performed without departing from the technical ideas stated in the claims, as appropriate.

The present disclosure has an effect of: enabling a highly visible image, from which a user is able to visually and intuitively grasp a Z direction position of a structure captured in an image and a front and back relation between structures, to be generated in a shorter time period than conventionally done; and enabling the amount of data and the amount of calculation in image processing to be reduced more than conventionally done.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscopy system comprising:
   a processor comprising hardware, wherein the processor is configured to:
      control an image sensor to acquire N*M multi-focused images of a subject captured by using an observation optical system of a microscope,
         wherein N represents the number of depth of field and each N of the N*M multi-focused images is acquired by shifting both of positions of a focal plane and a field of view of the observation optical system, and
         wherein shift amounts of the field of view are different among M of the N*M multi-focused images; and
      generate M all-focused images,
         wherein each of the M all-focused images is based on N of the N*M multi-focused images; and
      control a display to consecutively display the M all-focused images generated,
         wherein each of N and M is a natural number.

2. The microscopy system according to claim 1, wherein the processor is configured to determine an imaging start position for acquisition of each of the N*M multi-focused images, based on the shift amount acquired.

3. The microscopy system according to claim 1, wherein the processor is further configured to:
   determine, as an observed region, a region selected from any one of the M all-focused images, according to an operation performed from outside; and
   extract regions corresponding to the observed region from the remaining all-focused images of the M all-focused images other than the any one of the M all-focused images, from which the observed region has been selected, and acquire, based on shift amounts between a position of the observed region in the any one of the M all-focused images, from which the observed region has been selected, and positions of the regions in the M all-focused images, from which the regions have been extracted, a position of a slice including a structure in a subject, the structure corresponding to the observed region.

4. The microscopy system according to claim 1, wherein the each of the M all-focused images is based on N of the N*M multi-focused images, and on blurring information of images according to the shift amounts, and
wherein the blurring information is information generated by use of the shift amounts, and point spread functions representing blurring in the images.

5. The microscopy system according to claim 4, wherein the processor is configured to cause the image sensor to acquire, at the same shift amount, image information in each of the N of the N*M multi-focused images of the each of the M all-focused images.

6. A microscopy method comprising:
   controlling an image sensor to acquire N*M multi-focused images of a subject captured by using an observation optical system of a microscope,
      wherein N represents the number of depth of field and each N of the N*M multi-focused images is acquired by shifting both of positions of a focal plane and a field of view of the observation optical system, and
      wherein shift amounts of the field of view are different among M of the N*M multi-focused images; and
   generating M all-focused images,
      wherein each of the M all-focused images is based on N of the N*M multi-focused images; and
   controlling a display to consecutively display the M all-focused images generated,
      wherein each of N and M is a natural number.

7. A non-transitory computer-readable recording medium on which an executable program is recorded, wherein the program causes a processor to at least perform:
   controlling an image sensor to acquire N*M multi-focused images of a subject captured by using an observation optical system of a microscope,
      wherein N represents the number of depth of field and each N of the multi-focused images is acquired by shifting both of positions of a focal plane and a field of view of the observation optical system, and
      wherein shift amounts of the field of view are different among M of the N*M multi-focused images;
   generating M all-focused images, wherein each of the M all-focused images is based on N of the N*M multi-focused images; and controlling a display to display displaying consecutively the M plural all-focused images,
wherein each of N and M is a natural number.

* * * * *